US012481999B2

(12) United States Patent
Arora et al.

(10) Patent No.: US 12,481,999 B2
(45) Date of Patent: Nov. 25, 2025

(54) SECURE ANOMALY DETECTION USING FEDERATED LEARNING

(71) Applicant: Visa International Service Association, San Francisco, CA (US)

(72) Inventors: Sunpreet Singh Arora, Union City, CA (US); Panagiotis Chatzigiannis, Fairfax, VA (US); Sebastian Meiser, Lübeck (DE); Srinivasan Raghuraman, Cambridge, MA (US); Peter Byerley Rindal, San Francisco, CA (US); Yizhen Wang, Santa Clara, CA (US); Yuhang Wu, Santa Clara, CA (US); Hao Yang, San Jose, CA (US); Mahdi Zamani, Mercer Island, WA (US); Harshal Bhadreshkumar Shah, San Jose, CA (US); Andrew Beams, Christiansburg, VA (US)

(73) Assignee: Visa International Service Association, San Francisco, CA (US)

( * ) Notice: Subject to any disclaimer, the term of this patent is extended or adjusted under 35 U.S.C. 154(b) by 58 days.

(21) Appl. No.: 18/484,338

(22) Filed: Oct. 10, 2023

(65) Prior Publication Data
US 2025/0078083 A1  Mar. 6, 2025

(30) Foreign Application Priority Data

Sep. 1, 2023  (GR) ............................. 20230100708

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01); *G06Q 20/4014* (2013.01)

(58) Field of Classification Search
CPC . G06Q 20/4016; G06Q 20/4014; G06N 20/00
See application file for complete search history.

(56) References Cited

U.S. PATENT DOCUMENTS 11,080,352 B2 * 8/2021 Ma ...................... G06F 16/9536
11,783,031 B1 * 10/2023 Han ...................... G06N 3/098
726/23

(Continued)

OTHER PUBLICATIONS

Yesha Shastri, "A Step-by-Step Guide to Federated Learning in Computer Vision", Feb. 2023.*

(Continued)

*Primary Examiner* — Steven S Kim
(74) *Attorney, Agent, or Firm* — Kilpatrick Townsend & Stockton LLP

(57) ABSTRACT

Methods and systems for performing federated private anomaly detection are disclosed. An anomaly detector computer can collaborate with an aggregator computer and an account management computer in order to train machine learning models, which can be used to classify events as not fraudulent or fraudulent. The anomaly detector computer can obliviously use private information (e.g., account flags and account flag values) held by the account management computer to train and use the machine learning models, such that the anomaly detector does not become aware of the account flags or account flags values. Such a system can be used, for example, for the detection and prevention of financial crime. The anomaly detector computer can use the account flag information possessed by the account management computer to identify fraudulent events performed by customers of the organization operating the account management computer.

18 Claims, 6 Drawing Sheets

(56) References Cited

U.S. PATENT DOCUMENTS

| | | | |
|---|---|---|---|
| 11,848,915 B2* | 12/2023 | Arnon | G06N 5/04 |
| 11,907,403 B2* | 2/2024 | Ou | G06N 3/0985 |
| 2020/0293887 A1* | 9/2020 | De Brouwer | G06N 3/084 |
| 2021/0256309 A1* | 8/2021 | Huth | G06F 18/2148 |
| 2022/0247551 A1* | 8/2022 | Joye | H04L 9/008 |
| 2023/0289615 A1* | 9/2023 | Vandikas | G06F 21/6254 |
| 2024/0249153 A1* | 7/2024 | Kadhe | G06N 5/01 |
| 2024/0346379 A1* | 10/2024 | Ghodsi | G06N 20/00 |
| 2024/0362487 A1* | 10/2024 | ElKordy | G06N 20/00 |
| 2025/0028971 A1* | 1/2025 | Goodsitt | G06N 3/098 |

OTHER PUBLICATIONS

Ahmed Roushdy Elkordy, "HeteroSAg: Secure Aggregation with Heterogeneous Quantization in Federated Learning", Nov. 2021.*

Ben-Sasson et al., "Zerocash: Decentralized anonymous payments form bitcoin", 2014 IEEE Symposium on Security and Privacy, pp. 495-474, IEEE Computer Society Press (May 2014), doi.org/10.1109/SP.2014.36.

Chatzigiannis et al., "Auditability and accountability in distributed payment systems", Sako, K., Tippenhauer, N.O. (eds.) ACNS 21, Part II. LNCS, vol. 12727, pp. 311-337, Springer, Heidelberg (Jun. 2021), doi.org/10.1007/978-3-030-78375-4_13.

Cheng et al., "Secureboot: A lossless federated learning framework"; IEEE Intell. Syst. 36(6), pp. 87-98 (2021). doi.org/10.1109/MIS.2021.3082561, doi.org/10.1109/MIS.2021.3082561.

Hard et al., "Federated learning for mobile keyboard prediction", CoRR abs/1811.03604 (2018), 7 pages, http://arxiv.org/abs/1811.03604.

Jin et al., "CAFE: catastrophic data leakage in vertical federated learning", CoRR abs/2110.15122 (2021), 13 pages, arxiv.org/abs/2110.15122.

Kairouz et al., "Advances and open problems in federated learning", Trends Mach. Learn 14(1-2), 76 pages (2021). doi.org/10.1561/2200000083.

Li et al., "Privacy threats analysis to secure federated learning", CoRR abs/1909.12946 (2019), 12 pages, http://arxiv.org/abs/1909.12946.

Suzumura et al., "Toward federated graph learning for collaborative financial crimes detection", CoRR abs/1909.12946 (2019), http://arxiv.org/abs/1909.12946.

Van Saberhagen, "Cryptonote v 2.0", 2013, 29 pages, cryptonote.org/whitepaper.pdf.

Wei et al., "Vertical federated learning: Challenges, methodologies and experiments", CoRR abs/2202.04309 (2022), 7 pages, arxiv.org/abs/2202.04309.

* cited by examiner

SECURE ANOMALY DETECTION USING FEDERATED LEARNING

CROSS-REFERENCES TO RELATED APPLICATIONS

This application claims priority to GR application No. 20230100708, filed on Sep. 1, 2023 which is incorporated by reference in its entirety for all purposes.

BACKGROUND

Anomaly detection is a process in machine learning by which anomalous (e.g., not normal) data is detected from among normal data in a dataset. As an example, anomaly detection can be used to detect diseases (such as cancers) early by evaluating health data such as data collected from patient blood work.

As another example, anomaly detection can be used to identify financial transactions associated with illicit activities (e.g., drug trafficking or terrorism). The process of identifying financial transactions associated with illicit activities is one of the main tools that authorities utilize worldwide to combat crime. The Society for Worldwide Interbank Financial Telecommunication (SWIFT), a major network for international payments, is one of the main candidate organizations for deploying anomaly detection models that are able to identify such transactions. However, such anomaly detection models must be in accordance with privacy laws having a broad reach [2], making the design of such anomaly detection models challenging.

Given the tension between this goal and its desired properties, Federated Learning [8], (a paradigm which enables the application of machine learning techniques across multiple servers without the direct exchange of private or sensitive data) is a potential approach. While Federated Learning has been successfully deployed in real world application such as mobile keyboard's prediction models [6], using such algorithms as a "black-box" solution is not a viable approach for the purposes of privacy-preserving financial crime detection, as the architecture of the data held across parties (namely SWIFT and banks that accommodate accounts that send or receive funds) is not necessarily homogenous.

In particular, SWIFT, which facilitates the routing of a transaction from a sending bank to a receiving bank, learns detailed information about a transaction, such as the sender's and receiver's banks account numbers, names, addresses, and the associated currencies and amounts. While a centralized machine learning model could be deployed solely based on SWIFT's data with fair accuracy, it may be desirable to augment such models with additional information held by banks, which can improve the overall model's capabilities.

Expressed in more general terms, it is sometimes preferable to enhance the performance of machine learning models using private data held by multiple parties. However, it can be difficult to integrate this data into such machine learning models without violating the privacy of the parties.

Embodiments of the disclosure address this problem and other problems individually and collectively.

SUMMARY

One embodiment includes a method comprising: obtaining, by an anomaly detector computer, a plurality of training data records; generating, by the anomaly detector computer, a plurality of pairs of model updates corresponding to the plurality of training data records, each pair of model updates comprising an abnormal account model update and a normal account model update, each pair of model updates corresponding to an account management computer identifier and an account identifier, wherein each pair of model updates includes an update to a machine learning model; for each pair of model updates of the plurality of pairs of model updates: identifying, by the anomaly detector computer, a corresponding account management computer using the account management computer identifier; transmitting, by the anomaly detector computer, the account identifier to the corresponding account management computer, which identifies an account based on the account identifier, and determines an account flag value based on a status of the account; generating, by the anomaly detector computer, a random mask value; generating, by the anomaly detector computer, using the random mask value, a masked pair of model updates comprising a masked normal account model update and a masked abnormal account model update; and performing, by the anomaly detector computer, an oblivious transfer with the corresponding account management computer, the corresponding account management computer thereby receiving a selected masked model update comprising either the masked normal account model update or the masked abnormal account model update dependent on the account flag value, wherein the corresponding account management computer transmits the selected masked model update to an aggregator computer, the aggregator computer thereby receiving a plurality of selected masked model updates corresponding to the plurality of pairs of model updates from one or more account management computers; receiving, by the anomaly detector computer, from the aggregator computer, a masked aggregated model update, wherein the aggregator computer generated the masked aggregated model update from the plurality of selected masked model updates; unmasking, by the anomaly detector computer, the masked aggregated model update using one or more random mask values including the random mask value, thereby producing an aggregated model update; and updating, by the anomaly detector computer, the machine learning model using the aggregated model update.

Another embodiment is directed to an anomaly detector computer comprising: a processor; and a computer-readable medium coupled to the processor, the computer-readable medium comprising code executable by the processor for implementing a method comprising: obtaining, by an anomaly detector computer, a plurality of training data records; generating, by the anomaly detector computer, a plurality of pairs of model updates corresponding to the plurality of training data records, each pair of model updates comprising an abnormal account model update and a normal account model update, each pair of model updates corresponding to an account management computer identifier and an account identifier, wherein each pair of model updates includes an update to a machine learning model; for each pair of model updates of the plurality of pairs of model updates: identifying, by the anomaly detector computer, a corresponding account management computer using the account management computer identifier; transmitting, by the anomaly detector computer, the account identifier to the corresponding account management computer, which identifies an account based on the account identifier, and determines an account flag value based on a status of the account; generating, by the anomaly detector computer, a random mask value; generating, by the anomaly detector computer, using the random mask value, a masked pair of model updates comprising a masked normal account model update and a masked abnormal account model update; and performing, by the anomaly detector computer, an oblivious transfer with the corresponding account management computer, the corresponding account management computer thereby receiving a selected masked model update comprising either the masked normal account model update or the masked abnormal account model update dependent on the account flag value, wherein the corresponding account management computer transmits the selected masked model update to an aggregator computer, the aggregator computer thereby receiving a plurality of selected masked model updates corresponding to the plurality of pairs of model updates from one or more account management computers; receiving, by the anomaly detector computer, from the aggregator computer, a masked aggregated model update, wherein the aggregator computer generated the masked aggregated model update from the plurality of selected masked model updates; unmasking, by the anomaly detector computer, the masked aggregated model update using one or more random mask values including the random mask value, thereby producing an aggregated model update; and updating, by the anomaly detector computer, the machine learning model using the aggregated model update.

Another embodiment is directed to a method comprising: receiving, by an account management computer, an account identifier to from an anomaly detector computer; identifying, by the account management computer, an account based on the account identifier; determining, by the account management computer, an account flag value based on a status of the account; performing, by the account management computer, an oblivious transfer with the anomaly detector computer, the account management computer thereby receiving a selected masked model update comprising either the masked normal account model update or the masked abnormal account model update dependent on the account flag value; and transmitting, by the account management computer, the selected masked model update to an aggregator computer, wherein the aggregator computer receives a plurality of selected masked model updates from a plurality of account management computers including the account management computer, wherein the aggregator computer generates a masked aggregated model update from the plurality of selected masked model updates; wherein the anomaly detector computer receives the masked aggregated model update from the aggregator computer, wherein the anomaly detector computer unmasks the masked aggregated model update, thereby producing an aggregated model update, and wherein the anomaly detector computer updates a machine learning model using the aggregated model update.

These and other embodiments are described in further detail below.

DETAILED DESCRIPTION

Figure 1:
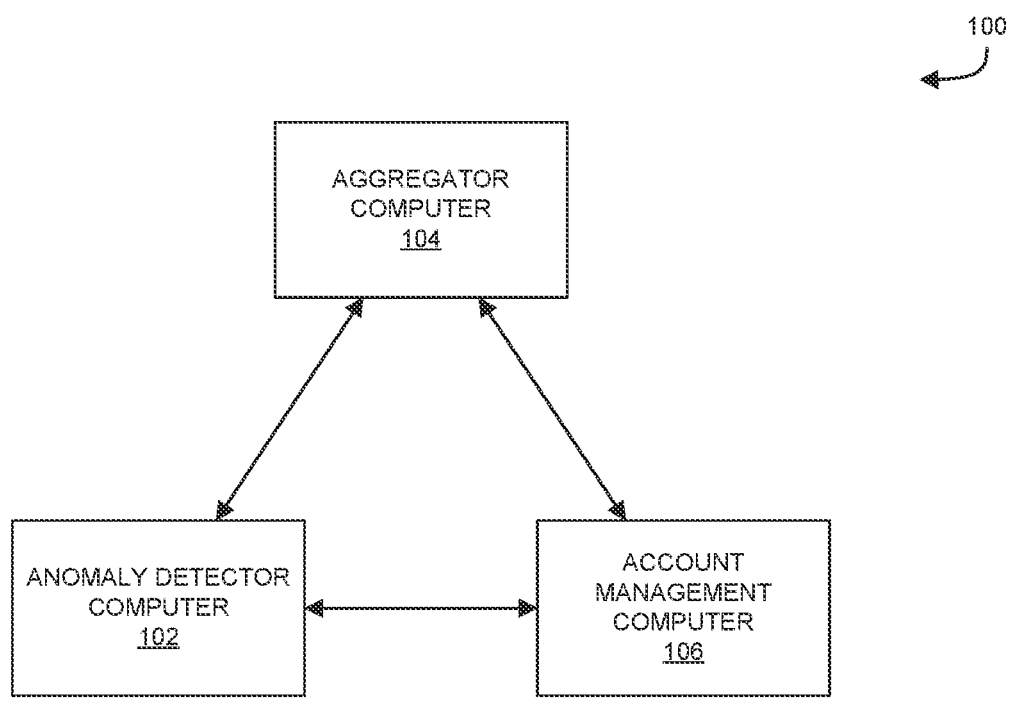
FIG. 1 shows a block diagram illustrating a secure anomaly detection system according to embodiments.

Prior to discussing embodiments of the disclosure, some terms can be described in further detail.

The term "artificial intelligence model" or "AI model" can include a model that may be used to predict outcomes in order achieve a pre-defined goal. The AI model may be developed using a learning algorithm, in which training data is classified based on known or inferred patterns. An AI model may also be referred to as a "machine learning model" or "predictive model."

"Machine learning" can include an artificial intelligence process in which software applications may be trained to make accurate predictions through learning. The predictions can be generated by applying input data to a predictive model formed from performing statistical analyses on aggregated data. A model can be trained using training data, such that the model may be used to make accurate predictions. The prediction can be, for example, a classification of an image (e.g., identifying images of cats on the Internet) or as another example, a recommendation (e.g., a movie that a user may like or a restaurant that a consumer might enjoy).

In some embodiments, a model may be a statistical model, which can be used to predict unknown information from known information. For example, a learning module may be a set of instructions for generating a regression line from training data (supervised learning) or a set of instructions for grouping data into clusters of different classifications of data based on similarity, connectivity, and/or distance between data points (unsupervised learning). The regression line or data clusters can then be used as a model for predicting unknown information from known information. Once model has been built from learning module, the model may be used to generate a predicted output from a new request. A new request may be a request for a prediction associated with presented data. For example, a new request may be a request for classifying an image or for creating a recommendation for a user.

"Normal" can indicate that something is usual, average, or in a typical state or condition. A thing, such as an account, can be flagged as normal. An account can be normal if the account is average or typical.

"Abnormal" can indicate that something is deviating from what is normal or usual. A thing, such as an account, can be flagged as abnormal. An account can be abnormal if the account is not average or not typical.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment. An example interaction can also be a money transfer transaction. The interaction can include a number of data elements such as a sender identifier, a receiver identifier, a transaction amount, a sender financial institution, a receiver financial institution, a time, a date, and other information.

"Model updates" can include information about a model with the latest information. A model update can be applied to a model to perform the update to the model. A model update can include numerical values that can used to update a model. In some embodiments, a model update can include gradient values that indicates how to update the weights and parameters of the model. A model update can be a gradient value derived from a gradient descent process. In an example embodiment, a model update can be formed by obtaining known interaction data (e.g., a sender identifier, a receiver identifier, a transaction amount, a sender financial institution, a receiver financial institution, a time, a date, and other information) for an interaction (e.g., a money transfer transaction), inputting the interaction data into a machine learning model, obtaining an output, and comparing the output to one or more known labels (e.g., fraud or not fraud) associated with the interaction data. Based on the comparison, gradient values can be formed such that the machine learning model can be adjusted to make more accurate predictions.

"Gradient descent" can include an optimization algorithm used to train machine learning models. Training data helps machine learning models learn over time, while a cost function within a gradient descent process specifically acts as a gauge that measures the accuracy of each iteration of weight and parameter updates to the machine learning model.

"Noise values" can include irregular fluctuations in value. Noise values can appear to be random. Noise values can be added to other values to obscure the other values.

An "account identifier" can include any piece of data that can identify an account. An account identifier can comprise any suitable alphanumeric string of characters. In some embodiments, the account identifier may be derived from account identifying information. In some embodiments, an account identifier can include a primary account number.

The term "public/private key pair" may include a pair of linked cryptographic keys generated by an entity. The public key may be used for functions such as encrypting a message to send to the entity or for verifying a digital signature which was supposedly made by the entity. The private key may be used for functions such as decrypting a received message or applying a digital signature. The public key can be authorized by a certificate authority, which can store the public key in a database and distribute it to any other entity which requests the public key. The private key can be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. Introduction

In recent years, there has been interest in studying various aspects of federated machine-learning, such as data distribution heterogeneity, security, privacy, fairness, and communication and/or computation efficiency [8]. SecureBoost [5] implemented a privacy-preserving machine learning system that considers a vertically-partitioned data set. Follow-up work [12] studied the challenges in the vertical federated learning setting, while CAFE [7] and similar works [9] studied data leakage attacks and countermeasures. [10]proposed a framework towards identifying patterns of suspicious transactions by combining graph-based machine learning techniques with federated learning across multiple financial institutions. However, this framework did not consider sharing heterogenous data among those institutions.

The tension between privacy and enforcement of regulations and laws in the context of payments has been demonstrated in the realm of blockchain-based cryptocurrencies. A number of such cryptocurrencies have been specifically designed to offer strong privacy to their users [3, 11], which however raised concerns for regulatory and law-enforcement authorities, since abusing those privacy properties enables the circumvention of regulatory controls or facilitate fraudulent/illegal activities (e.g., money laundering, extortion or drug trafficking [1]). Consequently, a number of follow-up works considered combining both of these desired properties (i.e., privacy and auditability) using advanced cryptographic tools [4].

Embodiments of the present disclosure are directed to federated machine learning methods and systems. Embodiments provide for a privacy-preserving federated learning solution to process transactions (e.g., through SWIFT) and classify the transactions with their association with fraudulent (e.g., illicit) activities.

An anomaly detector computer can train a model that classifies events as not fraudulent or fraudulent, without any input from any other entities or computer systems (e.g., those shown in FIG. 1). However, incorporating data held by account management computers can improve the model's performance as measured by metrics such as the area under the precision-recall curve. Estimates suggest that the area under the precision-recall curve can be improved from 0.53 to 0.63 by including account flag data possessed by account management computers into the anomaly detector computer's models. This account flag data can define a number of different characteristics (e.g., twelve different characteristics) about accounts managed by the account management computer. A 00 (or 0) flag can denote a normal account (e.g., an account in good standing), and other flags (e.g., flags 01-11) can denote abnormal account states.

For example, for an account management computer corresponding to a bank (e.g., a computer system that manages bank accounts), a flag such as 01 could indicate that an account has been frozen, while a flag such as 02 could indicate that an account is being watched for fraud. In some embodiments, these accounts can be receiver accounts (e.g., corresponding to accounts that received funds as part of a transaction event). While it may be reasonable to assume that events corresponding to abnormal accounts may be fraudulent (e.g., transactions performed by flagged accounts), it is possible that abnormal accounts may still be involved in non-fraudulent events (e.g., legitimate transactions, but the account can be considered abnormal such as in the case of an account held by a recently deceased person). As such, anomaly detection systems according to embodiments do not necessarily assume that a flagged account is part of a fraudulent event.

Generally, it can be assumed that all parties and computer systems are at worst honest-but-curious, in terms of security. This can be that the computer systems can attempt to learn sensitive information, but otherwise can follow methods according to embodiments in order to produce correct results (e.g., accurate anomaly classifications or labels).

Embodiments can utilize cryptographic primitives and techniques such as homomorphic encryption, partially homomorphic encryption, and secure multi-party computation. To maintain the secrecy of account flags and account flag values during training, machine learning model updates created by an anomaly detector computer can be aggregated and noise can be added by an aggregator computer, thereby protecting the privacy of the account management computer's data. Applying noise can hinder inference attacks, and if the amount of noise is sufficiently high, applying noise can even guarantee differential privacy.

One technical privacy problem is to minimize leaking private data from its respective data custodians. Embodiments of the present disclosure prevent account management computers from learning any data from the anomaly detector computer, other than which accounts were queried for training or inference. Further, embodiments minimize leakage of the account management computers' private data (e.g., account flags, account flag values) to the anomaly detector computer. Any data leakage is comparable to an inherent leakage from the account management computers' data to the anomaly detector computer. For example, if the anomaly detector computer does not detect an anomaly using the normal account machine learning model, but the overall label or classification it generates is an anomaly classification, then this classification can be due to the account flag. Consequently, the anomaly detector computer can determine the account flag value corresponding an account corresponding to the event (e.g., transaction).

Embodiments can be generalized to more complex heterogeneous settings. For example, multiple anomaly detector computers can train their own models incrementally (e.g., by gradient descent) and send encrypted updates to the aggregator computer. The privacy properties hold if during an aggregation step (e.g., model selection, vector concatenation, weighted sum, etc.) can be efficiently computed while the updates are encrypted. Embodiments can also be generalized to incorporate fully malicious account management computers and aggregator computers at a cost to efficiency.

According to embodiments, an anomaly detector computer (e.g., a SWIFT computer) can instantiate and maintain a machine learning model, M, to learn non-fraudulent and fraudulent transactions. Training is performed over batches of training transactions. For each transaction in a batch, the anomaly detector computer computes two updates for the machine learning model M: one assuming the receiving account of the transaction is not fraudulent and one assuming it is fraudulent. At this point, the anomaly detector computer, an account management computer (e.g., a receiving bank computer), and an aggregator computer can participate in a secure multi-party computation (MPC) execution to select the correct update based on the receiver account's flag from the account management computer. The security of the MPC guarantees that this selection is oblivious, that is, the parties do not learn the recipient account's flag. This process is repeated for all transactions in a batch. After selecting and aggregating updates, the aggregator computer adds a sufficient amount of noise to the aggregated update for the current batch, and the final aggregated and noised update is revealed to the anomaly detector computer. The addition of noise allows for the ability to hide contributions of individual transactions in the aggregated update protecting them from potential inference attacks. The security of the MPC guarantees that only the anomaly detector computer learns this final update and thus neither the aggregator computer nor the account management computer can gain insight into the anomaly detector computer's transaction data. Finally, the anomaly detector computer applies the aggregated (and noised) model update to the anomaly detector computer's local machine learning model M. The training process then continues for the next batch of transactions.

When the anomaly detector computer receives a transaction, the anomaly detector computer can run the transaction through the model twice: once assuming the recipient's account is normal and once assuming the account is abnormal, in order to obtain two labels. Then, the protocol proceeds in a similar fashion to the training phase. The main difference during inference is that the anomaly detector computer and the account management computer can engage in a secure two-party computation without involving the aggregator (note that during inference, no noise is added either). The anomaly detector computer provides the two labels it computed as input to the secure two-party computation, while the account management computer provides the receiver account's flag. The result of the two-party computation is that the anomaly detector computer learns whether or not the transaction is anomalous without learning anything about the recipient account's flag from the account management computer.

II. Secure Anomaly Detection System

Embodiments provide for a secure anomaly detection system capable of training a machine learning model in a privacy-preserving manner using data records (e.g., transaction data) from an anomaly detector computer along with account flags from an account management computer. An anomaly detector computer, an aggregator computer, and one or more account management computers can communicate to train the machine learning model and determine inferences from the machine learning model.

A. System Overview

FIG. 1 shows a system 100 according to embodiments of the disclosure. The system 100 comprises an anomaly detector computer 102, an aggregator computer 104, and an account management computer 106. The aggregator computer 104 can be in operative communication with the anomaly detector computer 102 and the account management computer 106. The anomaly detector computer 102 can be in operative communication with the account management computer 106.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices included in the system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The anomaly detector computer 102 can include a computer or a server computer configured to detect anomalies. The anomaly detector computer 102 can detect anomalies in data processed by the anomaly detector computer 102. For example, the anomaly detector computer 102 can process transactions and transaction data. The anomaly detector computer 102 can perform methods described herein to train machine learning models using transaction data as well as data provided by the account management computer 106, without learning the data provided by the account management computer 106.

The anomaly detector computer 102 can generate two model updates when updating the machine learning model. The anomaly detector computer 102 can generate a pair of model updates corresponding to a plurality of training data records. Each pair of model updates can comprise an abnormal account model update and a normal account model update. Each pair of model updates can correspond to an account management computer identifier of an account management computer 106 with which the training data records correspond. The model updates can include gradients determined from a gradient descent model update process.

The anomaly detector computer 102 can classify transactions as being not fraudulent or fraudulent using the trained machine learning model. The anomaly detector computer 102 can input transaction data into the machine learning model for classification twice. The anomaly detector computer 102 can label the transaction data as not fraudulent and input the transaction data into the machine learning model to determine a first label. The anomaly detector computer 102 can then label the transaction data as fraudulent and input the transaction data into the machine learning model to determine a second label.

For example, during classification of a transaction, the anomaly detector computer 102 does not know if the transaction data corresponds to a not fraudulent transaction or to a fraudulent transaction. The anomaly detector computer 102 can create two versions of the transaction data, one labeled as a not fraudulent transaction and one labeled as a fraudulent transaction. The anomaly detector computer 102 can input each differently labeled version of the transaction data into the trained machine learning model. The anomaly detector computer 102 obtains the outputs of the machine learning model, which include a first label and a second label. The first label can be the output that corresponds to the input of the transaction data labeled as not fraudulent. The second label can be the output that corresponds to the input of the transaction data labeled as fraudulent.

The anomaly detector computer 102 can perform a secure multi-party computation exchange with the account management computer 106 to determine which of the two labels is the correct label. For example, the anomaly detector computer 102 and the account management computer 106 can perform a two-party oblivious transfer communication protocol, as described in further detail herein.

The aggregator computer 104 can include a computer or a server computer configured to facilitate the anomaly detector computer 102 with securely and privately training the machine learning model using data (e.g., account flags) from the account management computer 106. The aggregator computer 104 can aggregate one or more model updates from the anomaly detector computer 102 and add noise values to the model updates.

The account management computer 106 can include a computer or a server computer configured to maintain accounts for users. The account management computer 106 can securely and privately provide account flag data to the aggregator computer 104 and the anomaly detector computer 102 during a secure multi-party computation process to facilitate the anomaly detector computer 102 in training a machine learning model. The account management computer 106 does not need to provide the account flag data in plaintext to the anomaly detector computer 102 or the aggregator computer 104.

Embodiments described herein are described in reference to training the machine learning model with additional account data from the account management computer 106. However, it is understood that other data from the account management computer 106 can be utilized to aid, in a privacy-preserving manner, in the training of the machine learning model.

The account management computer 106's data can include an account flag value. The account flag value can indicate if a corresponding account is normal (e.g., 0) or abnormal (e.g., 1). In some embodiments, the account flag value can indicate further information regarding the account. For example, the account flag value can define twelve different account characteristics, where all but one account flag values denote an abnormal account state. In such a case, the flag of 0 can indicate a normal account. The flags 1-11 can indicate various types of abnormal accounts (e.g., a fraudulent account, a deceased person's account, a frozen account, etc.). The account management computer 106 can internally utilize the twelve different account flag values, but can communicate externally using only two account flag values where the abnormal account flags (e.g., flags 1-11) are all identified with a generic abnormality flag of 1.

To incorporate this extra information into the machine learning model, the anomaly detector computer 102 can train the machine learning model with a secret input distinguishing between normal accounts and abnormal ones. During training, the anomaly detector computer 102 can select a batch of transactions and compute updates to the model for both possible inputs for each transaction in the batch. For each transaction, the anomaly detector computer 102, the account management computer 106, and the aggregator computer 104 can perform an instance MPC. The anomaly detector computer 102 can provide the two possible updates for the transaction, and the receiver bank provides a bit indicating whether the receiver account was normal or abnormal.

The MPC ensures that the computers obliviously select the correct update, based on the bit provided by the account management computer 106. All such selected updates are then aggregated. Finally, the aggregator computer 104 also adds enough noise to hide contributions of individual transactions to protect against inference attacks by the anomaly detector computer 102. The MPC ensures that this aggregated and noised update for the entire batch is revealed to the anomaly detector computer 102 alone. The magnitude of noise used is a hyperparameter that depends on the batch size, the clipping bound, and the desired level of privacy. So, neither the aggregator computer 104 nor the account management computer 106 can gain insight into the transaction details.

Figure 2:
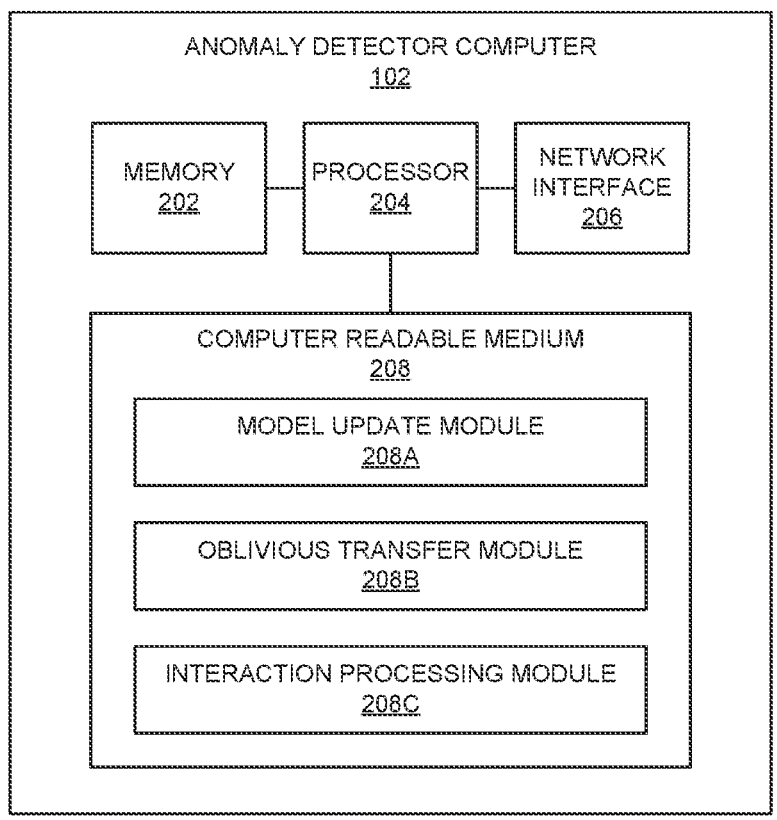
FIG. 2 shows a block diagram illustrating an anomaly detector computer according to embodiments.

During inference, when the anomaly detector computer 102 receives a transaction and wants to classify the transaction, the anomaly detector computer 102 runs the transaction through the model with both inputs of account status (e.g., input as being assumed to be associated with a normal account and input as being assumed to be associated with an abnormal account) to obtain two possible model outputs, or labels. The anomaly detector computer 102 and the account management computer 106 perform an instance of secure two-party computation. The anomaly detector computer 102 provides the two possible labels for the transaction, while the account management computer 106 provides a bit indicating whether the receiver account was normal or abnormal. The computation ensures that the computers obliviously select the correct label and reveal the correct label to the anomaly detector computer 102 alone. B. Anomaly Detector Computer FIG. 2 shows a block diagram of the anomaly detector computer 102 according to embodiments. The exemplary anomaly detector computer 102 may comprise a processor 204. The processor 204 may be coupled to a memory 202, a network interface 206, and a computer readable medium 208. The computer readable medium 208 can comprise a model update module 208A, an oblivious transfer module 208B, and an interaction processing module 208C.

The memory 202 can be used to store data and code. For example, the memory 202 can store model updates, model weights, transaction data, cryptographic keys, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: obtaining, by an anomaly detector computer, a plurality of training data records; generating, by the anomaly detector computer, a plurality of pairs of model updates corresponding to the plurality of training data records, each pair of model updates comprising an abnormal account model update and a normal account model update, each pair of model updates corresponding to an account management computer identifier and an account identifier, wherein each pair of model updates includes an update to a machine learning model; for each pair of model updates of the plurality of pairs of model updates: identifying, by the anomaly detector computer, a corresponding account management computer using the account management computer identifier; transmitting, by the anomaly detector computer, the account identifier to the corresponding account management computer, which identifies an account based on the account identifier, and determines an account flag value based on a status of the account; generating, by the anomaly detector computer, a random mask value; generating, by the anomaly detector computer, using the random mask value, a masked pair of model updates comprising a masked normal account model update and a masked abnormal account model update; and performing, by the anomaly detector computer, an oblivious transfer with the corresponding account management computer, the corresponding account management computer thereby receiving a selected masked model update comprising either the masked normal account model update or the masked abnormal account model update dependent on the account flag value, wherein the corresponding account management computer transmits the selected masked model update to an aggregator computer, the aggregator computer thereby receiving a plurality of selected masked model updates corresponding to the plurality of pairs of model updates from one or more account management computers; receiving, by the anomaly detector computer, from the aggregator computer, a masked aggregated model update, wherein the aggregator computer generated the masked aggregated model update from the plurality of selected masked model; unmasking, by the anomaly detector computer, the masked aggregated model update using one or more random mask values including the random mask value, thereby producing an aggregated model update; and updating, by the anomaly detector computer, the machine learning model using the aggregated model update.

The model update module 208A may comprise code or software, executable by the processor 204, for updating a model. The model update module 208A, in conjunction with the processor 204, can update one or more machine learning models. The model update module 208A, in conjunction with the processor 204, can update a machine learning model using an aggregated model update. The aggregated model update can be aggregated from a plurality of model updates. Each model update can be a gradient value that indicates how the weights and the parameters of the machine learning model are to be updated. The model update module 208A, in conjunction with the processor 204, can update the machine learning model based on the gradient value of the aggregated model update to adjust the weights and parameters of the machine learning model.

The oblivious transfer module 208B can include may comprise code or software, executable by the processor 204, for performing an oblivious transfer process. The oblivious transfer module 208B, in conjunction with the processor 204 can perform a 1-2 oblivious transfer process or other suitable oblivious transfer process. The oblivious transfer process can be performed as described in detail herein.

The interaction processing module 208C can include may comprise code or software, executable by the processor 204, for processing interactions. The interaction processing module 208C, in conjunction with the processor 204, can process interaction such as transactions. The interaction processing module 208C, in conjunction with the processor 204, can receive interaction data related to an interaction between two entities. The interaction processing module 208C, in conjunction with the processor 204, can utilize a trained machine learning model to classify the interaction as being a not fraudulent interaction or as being a fraudulent interaction. In some embodiments, the interaction processing module 208C, in conjunction with the processor 204, can authorize or decline the interaction.

The network interface 206 may include an interface that can allow the anomaly detector computer 102 to communicate with external computers. The network interface 206 may enable the anomaly detector computer 102 to communicate data to and from another device (e.g., the aggregator computer 104, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

C. Aggregator Computer

Figure 3:
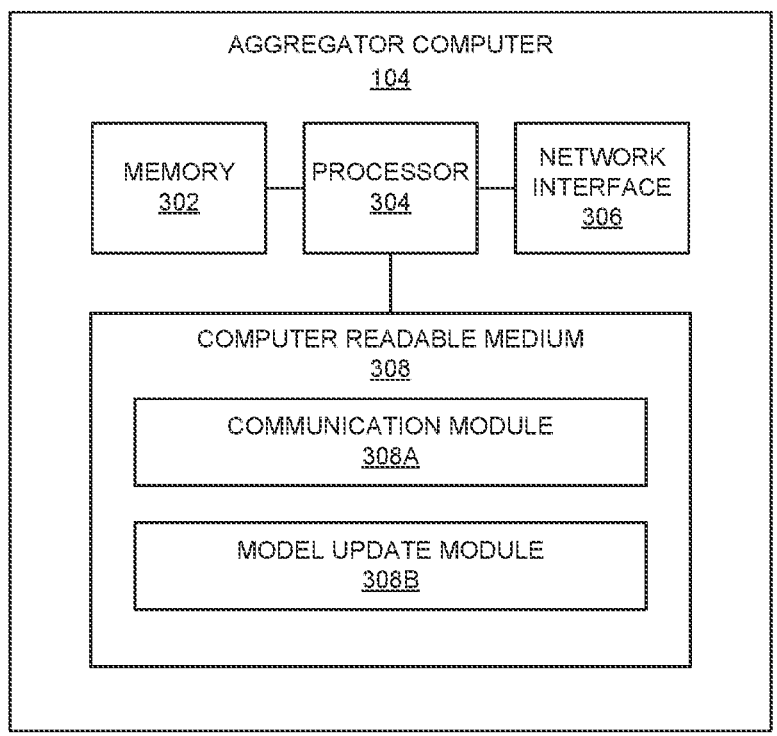
FIG. 3 shows a block diagram illustrating an aggregator computer according to embodiments.

FIG. 3 shows a block diagram of the aggregator computer 104 according to embodiments. The exemplary aggregator computer 104 may comprise a processor 304. The processor 304 may be coupled to a memory 302, a network interface 306, and a computer readable medium 308. The computer readable medium 308 can comprise a communication module 308A and a model update module 308B.

The memory 302 can be used to store data and code and may be similar to the memory 202 as described herein. For example, the memory 302 can store noise values.

The computer readable medium 308 may comprise code, executable by the processor 304, for performing the methods described herein.

The communication module 308A may comprise code or software, executable by the processor 304, for communicating with other devices. The communication module 308A, in conjunction with the processor 304, can receive and send messages. The communication module 308A, in conjunction with the processor 304, can secure messages using any suitable encryption process (e.g., public-private key cryptography).

The model update module 308B can include may comprise code or software, executable by the processor 304, for processing model updates. The model update module 308B, in conjunction with the processor 304, can securely, in a privacy-preserving manner, aggregate a plurality of masked model updates into a masked aggregated model update. The model update module 308B, in conjunction with the processor 304, can also add noise value(s) to the masked aggregated model update to create masked aggregated noisy model update.

The network interface 306 may be similar to the network interface 206 and will not be repeated here.

D. Account Management Computer

Figure 4:
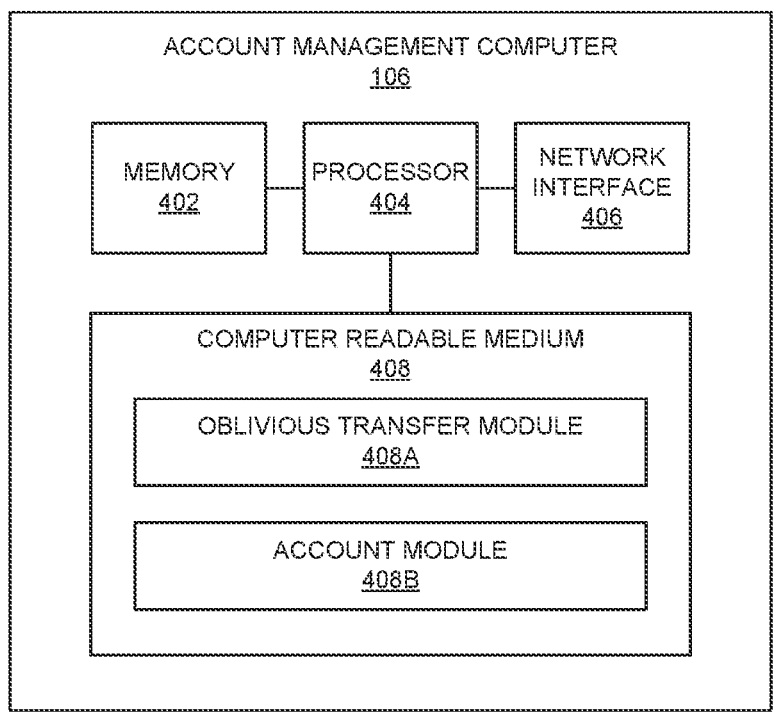
FIG. 4 shows a block diagram illustrating an account management computer according to embodiments.

FIG. 4 shows a block diagram of the account management computer 106 according to embodiments. The exemplary account management computer 106 may comprise a processor 404. The processor 404 may be coupled to a memory 402, a network interface 406, and a computer readable medium 408. The computer readable medium 408 can comprise an oblivious transfer module 408A and an account module 408B.

The memory 402 can be used to store data and code and may be similar to the memory 202 as described herein. For example, the memory 402 can store account data, account flags, etc.

The computer readable medium 408 may comprise code, executable by the processor 404, for performing a method comprising: receiving, by an account management computer, an account identifier to from an anomaly detector computer; identifying, by the account management computer, an account based on the account identifier; determining, by the account management computer, an account flag value based on a status of the account; performing, by the account management computer, an oblivious transfer with the anomaly detector computer, the account management computer thereby receiving a selected masked model update comprising either the masked normal account model update or the masked abnormal account model update dependent on the account flag value; and transmitting, by the account management computer, the selected masked model update to an aggregator computer, wherein the aggregator computer receives a plurality of selected masked model updates from a plurality of account management computers including the account management computer, wherein the aggregator computer generates a masked aggregated model update from the plurality of selected masked model updates; wherein the anomaly detector computer receives the masked aggregated model update from the aggregator computer, wherein the anomaly detector computer unmasks the masked aggregated model update, thereby producing an aggregated model update, and wherein the anomaly detector computer updates a machine learning model using the aggregated model update.

The oblivious transfer module 408A may comprise code or software, executable by the processor 404, for performing an oblivious transfer process. The oblivious transfer module 408B, in conjunction with the processor 404 can perform a 1-2 oblivious transfer process or other suitable oblivious transfer process. The oblivious transfer process can be performed as described in detail herein. The oblivious transfer module 408A can be similar to the oblivious transfer module 208B.

The account module 408B can include may comprise code or software, executable by the processor 404, for processing account information. The account module 408B, in conjunction with the processor 404, can identify accounts maintained by the account management computer 106 using account identifiers. The account module 408B, in conjunction with the processor 404, can determine account flag values that indicate whether the account is classified as a normal account or is classified as an abnormal account. The account module 408B, in conjunction with the processor 404, can classify the account based on the account history.

The network interface 406 may be similar to the network interface 206 and will not be repeated here.

III. Threat Model

Embodiments consider the anomaly detector computer 102, the aggregator computer 104, and an arbitrary number of account management computers (e.g., the account management computer 106) as the main system participants, where the anomaly detector computer 102 and the account management computer's each hold their own private data. One technical solution provided herein is to enable the anomaly detector computer 102 to determine if a transaction is anomalous or not with high accuracy, while protecting against private data leakage from the respective data holders.

In addition, the anomaly detector computer 102 should be the only entity which will eventually learn the model's final classification outputs. Embodiments can assume a single global adversary that is allowed to corrupt some subset of the parties (e.g., the anomaly detector computer 102, the aggregator computer 104, and the account management computers). However, for evaluation, restrictions are placed on the set of parties the adversary can corrupt. In particular, it can be assumed that the anomaly detector computer 102 and the aggregator computer 104 are not both corrupted, although any subset of parties not containing both the anomaly detector computer 102 and the aggregator computer 104 may be corrupted while maintaining security. Note that if the anomaly detector computer 102 and all of the banks are all corrupted, there is nothing to prove as these are the only parties holding any private data.

To argue the security of the protocol and that the private data of honest parties is not revealed, embodiment can utilize MPC. In particular, the computers can use some form of encryption while sending messages back and forth to compute the desired functionality without revealing the inputs themselves.

A. Network-Level Observers

A network level adversary without any insights into the anomaly detector computer 102, the account management computers, or the aggregator computer 104 can observe the traffic between all computers. Given that all computers can use secure communication, such an adversary cannot gain insights into the messages themselves, and thus can only gain metadata information, specifically: such an adversary can learn which account management computer is contacted at which point in time (for the currently processed transaction). As such an outsider can see strictly less than the aggregator computer 104 during the training phase.

B. Inherent Privacy Leakage

Note there will always be some information leakage inherent to the general problem setting and not specific to the solution. The anomaly detector computer 102 has enough information to create its own local models that can classify a transaction's anomaly with fair accuracy (e.g., solely based on the transaction features already known by the anomaly detector computer 102). The anomaly detector computer 102 is only missing the data of the account flag held by the account management computer 106. Information leakage can be when one computer can deduce the data of another computer due to a set of circumstances. Information leakage can occur, if the anomaly detector computer 102 classifies a transaction as being not anomalous using its own local model, but the overall classification process labels the transaction as anomalous, then the anomaly detector computer 102 can reliably predict that the receiving account has a flag deviating from normal. If the overall process labels a transaction as not fraudulent, then the anomaly detector computer 102 knows that the receiving account has flag of normal. In addition, the anomaly detector computer 102 can further deduce that a transaction being present in the data set means that the sending account always has a flag of normal. Another form of inherent privacy leakage is that the account management computer 106 learns the specific account queried during training or inference phases.

IV. Secure Anomaly Detection

According to embodiments, the anomaly detector computer 102 trains a model M with a secret input that differs for normal accounts and for abnormal accounts. The anomaly detector computer 102 initializes this model, but requires aid in training the model to increase model label determination accuracy.

The anomaly detector computer 102 can train a model M with (in addition to training data records) a secret input that differentiates between normal and abnormal accounts. The secret input can indicate to the model M whether a training data record corresponds to a normal account or an abnormal account. The anomaly detector computer 102 can initialize this model and train it with the aid of one or more account management computers and an aggregator computer 104.

In some embodiments, there can be an underlying public key infrastructure in place, and the anomaly detector computer 102, account management computers, and aggregator computer 104 can encrypt messages using the other parties' public keys. The anomaly detector computer 102 can use account management computer public keys to encrypt account identifiers. The account management computers can use the anomaly detector computer 102's public keys to encrypt other information.

A. Training Phase and Inference Phase During Secure Anomaly Detection

Figure 5:
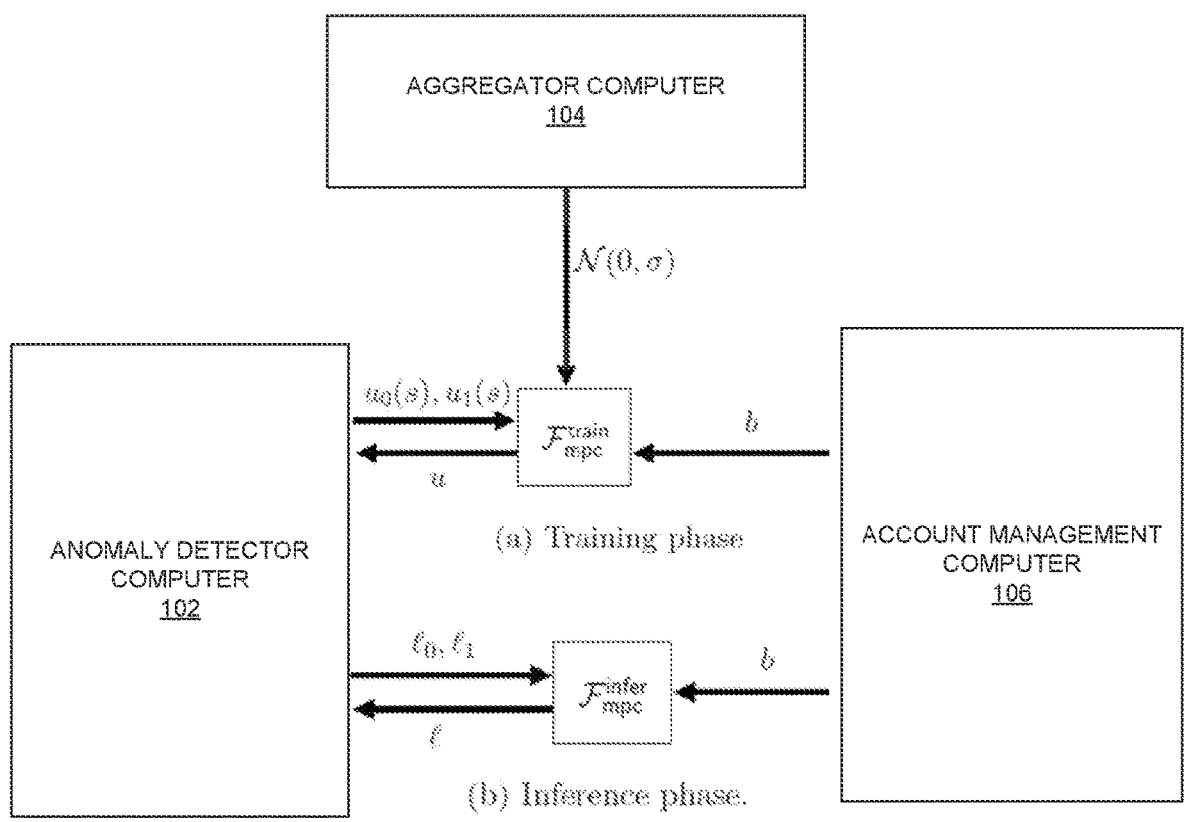
FIG. 5 shows a flow diagram illustrating a training phase and an inference phase during a secure anomaly detection method according to embodiments.

FIG. 5 shows a flow diagram illustrating a training phase and an inference phase during a secure anomaly detection method according to embodiments. During training (a), the anomaly detector computer 102 can contribute two updates $u_0(s)$ and $u_1(s)$ to a secure training multi-party computation $\mathcal{F}_{mpc}^{train}$. The account management computer 106 can each contribute bits b that indicate whether corresponding receiver accounts are normal or abnormal for every element of training data in a batch. The aggregator computer 104 can sample noise $\mathcal{N}(0,\sigma)$ for the entire batch. The participating computers described above can then use the secure training multi-party computation $\mathcal{F}_{mpc}^{train}$ to reveal the aggregated noisy model updates u to the anomaly detector computer 102. During inference (b), the anomaly detector computer 102 can provide two labels $l_0$ and $l_1$ while the account management computer 106 can provide a bit b to a secure inference multi-party computation $\mathcal{F}_{mpc}^{infer}$ to reveal the correct label l to the anomaly detector computer 102.

In more detail, an anomaly detector computer 102 can initialize and manage a training procedure which can operate in batches. For each batch, the anomaly detector computer 102 can randomly sample a batch K comprising k data records (e.g., transaction data records), where k is a hyperparameter. For each data record s, the anomaly detector computer 102 can locally input s into a machine learning model M twice, a first time with a secret input set to indicate that the data record s corresponds to a normal account, and a second time with the secret input set to indicate that the data record s corresponds to an abnormal account. At this time, the anomaly detector computer 102 may not be aware of whether a receiving account, corresponding to the data record s, corresponds to a normal receiving account or an abnormal receiving account.

$B_r(s)$ denotes the account management computer 106 corresponding to the data record s, and $a_r(s)$ denotes a receiving account identifier corresponding to a receiving account corresponding to the data record s. The anomaly detector computer 102 can transmit the receiving account identifier $a_r(s)$ to the account management computer $B_r(s)$.

The anomaly detector computer 102, the account management computer 106, and the aggregator computer 104 can engage in a secure multi-party computation process (e.g., using secret sharing or homomorphic encryption). The anomaly detector computer 106 can privately input secret shares of a normal account model update $[\![u_0(s)]\!]$ and secret shares of an abnormal account model update $[\![u_1(s)]\!]$ into the multi-party computation process. The double brackets $[\![x]\!]$ can indicate that a value x is privately input according to the multi-party computation process. The account management computer 106 can input shares of an indicator bit $[\![b]\!]$ into the multi-party computation process. The indicator bit b can comprise a bit indicating whether the data record s corresponds to a normal account or an abnormal account. The computation of the multi-party computation process can result in the anomaly detector computer 102 and the aggregator computer 104 learning secret shares $[\![u_b(s)]\!]$ of a selected model update $u_b(s)$, which is selected between the normal account model update $u_0(s)$ and the abnormal account model update $u_1(s)$. More concretely, secret shares of the selected model update can be computed as:

$$[\![u(s)]\!] = $$
$$([\![1]\!] - [\![b]\!]) * [\![u_0(s)]\!] + [\![b]\!][\![u_1(s)]\!] = [\![b]\!] * ([\![u_1(s)]\!] - [\![u_0(s)]\!]) + [\![u_0(s)]\!]$$

This can be accomplished using a single multiplication on the shared or encrypted data (with the bit b) and then converted to secret shared data between the anomaly detector computer 102 and the aggregator computer 104. More implementation details are provided further below. Outputting these secret shares has a privacy guarantee that neither the anomaly detector computer 102 or the aggregator may be able to learn the plaintext value of u(s). $[\![u(s)]\!]$ can denote the secret share held by the anomaly detector computer 102 and the aggregator computer 104.

The aggregator computer 104 and anomaly detector computer 102 can repeat this process with each account management computer in the batch K, which results in a number of secret shared model updates $[\![u(s)]\!]$ equal to the batch size. In some embodiments, these secret shared model updates can originate from one or more account management computers.

The aggregator computer 104 can encrypt a sample of Gaussian noise $\mathcal{N}(0, \sigma)$ with a mean of 0 and standard deviation $\sigma$ to obtain $[\![\mathcal{N}(0,\sigma)]\!]$. The aggregator computer 104 and the anomaly detector computer 102 can aggregate the secret shared model updates $[\![u(s)]\!]$ and the noise to yield secret shares of a masked aggregated noisy model update $[\![u]\!] = \Sigma_{s \in K}[\![u(s)]\!] + [\![\mathcal{N}(0,\sigma)]\!]\mathcal{N}$. The secret shares of the masked aggregated noisy model update $[\![u]\!]$ can be provided to the anomaly detector computer 102 by the aggregator computer 104.

The anomaly detector computer 102 can then decrypt the secret shares of the masked aggregated noisy model update $[\![u]\!]$, acquiring a plaintext masked aggregated noisy model update u in the process. The anomaly detector computer 102 can then update the model M using the masked aggregated noisy model update u. This process can be repeated for a desired number of training iterations. For example, the training process illustrated in FIG. 5 can be repeated until the model M converges.

In some embodiments, The training functionality $\mathcal{F}_{mpc}^{train}$ can take $\{(B_i, a_i, u_{i,0}, u_{i,1}) | i \in batch\}$ as input from the anomaly detector computer 102, where $u_{i,0}$ and $u_{i,1}$ are the updates corresponding to an account $a_i$ maintained by the account management computer 106 $B_i$. The training functionality $\mathcal{F}_{mpc}^{train}$ also takes $b_i$ as input from the account management computer 106, where $b_i$ is the indicator flag for the account $a_i$. The training functionality $\mathcal{F}_{mpc}^{train}$ can also take the noise N(0, $\sigma$) as input from the aggregator computer 104. The training functionality $\mathcal{F}_{mpc}^{train}$ can compute:

$$u' = \sum_i u_i, b_i$$
$$u = u' + N(0, \sigma)$$

Output u to the anomaly detector computer 102.

After training the machine learning model, the anomaly detector computer 102 can perform inference on transactions. During inference, the anomaly detector computer 102 may receive a training data record s and attempt to produce a label. For example, the training data record s can include a transaction with transaction data. The anomaly detector computer 102 can process the transaction. During processing of the transaction, the anomaly detector computer 102 can analyze the transaction using the trained machine learning model to determine if the transaction should be categorized as not fraudulent or as fraudulent.

The anomaly detector computer 102 can input the training data record s and a secret input into the trained machine learning model M twice, once assuming the training data record s corresponds to a normal account and once assuming the training data record s corresponds to an abnormal account. In doing so, the anomaly detector computer 102 can produce a preliminary normal account label $l_0$ and a preliminary abnormal account label $l_1$. The secret input can be set to indicate that the input training data record s is assumed to be normal or to be abnormal.

The anomaly detector computer 102 and the account management computer 106 can then engage in a secure two-party computation with private inputs of secret shares of the preliminary normal account label $[\![l_0]\!]$ and secret shares of the preliminary abnormal account label $[\![l_1]\!]$, from the anomaly detector computer 102, and secret shares of an indicator bit $[\![b]\!]$, from the account management computer 106. The indicator bit b can indicate whether the training data record s (e.g., a transaction) corresponds to a normal account or an abnormal account. As a result of this computation, the anomaly detector computer 102 can learn a final label output l from a secret shared final label output $[\![l]\!]$. The secret shared final label output $[\![l]\!]$ can be determined as $[\![l]\!] = ([\![1]\!] - [\![b]\!]) * [\![l_0]\!] + [\![b]\!] * [\![l_1]\!]$.

B. Training and Multi-Party Computation Methods

The anomaly detector computer 102 can use any model structure that can be trained by incremental and aggregatable updates. For example, the anomaly detector computer 102 can use a machine learning model that can be trained using stochastic gradient descent. In some embodiments, the anomaly detector computer 102 can use a classical multi-layer perceptron (MLP) model with ReLU as an activation function for the machine learning model M. The machine learning model M can be trained with stochastic gradient descent. Since the training data is extremely unbalanced between the classes of normal and abnormal (e.g., about 1 in 1000 abnormal rate), the training data can be up-sampled. In particular, the abnormal transactions can be up-sampled by drawing with replacement. The final training set can be class balanced between normal and abnormal.

Incremental and aggregateable updates can satisfy the following properties: 1) for every batch K with transactions $s_1, \ldots, s_k$ the anomaly detector computer 102 can compute updates $u_1, \ldots u_k$ per transaction and independently of other transactions ($u_i$ can be computed from $s_i$ and M); 2) moreover, each update $u_1$ can be limited in size and the overall update U can be computed as $\Sigma_{i \in I \subseteq \{1, \ldots, k\}} u_i + N(0,\sigma)$. Training can be performed by applying only u to the model after each batch, without other knowledge of the individual components $u_i$ used to compute the aggregate.

In some embodiments, the data held by the anomaly detector computer 102 (e.g., transaction data) can be used for feature engineering. The anomaly detector computer 102 can use XGBoost to train a local model within the anomaly detector computer 102 first to decide what the features should be. This way, the features used in the machine learning model do not depend on data outside of the anomaly detector computer 102.

The multi-party computation functionality for training $\mathcal{F}_{mpc}^{train}$ and the multi-party computation functionality for inference $\mathcal{F}_{mpc}^{infer}$ can be realized using a combination of oblivious transfer and secret sharing. Oblivious transfer can include, as an example, a two-party secure communication protocol that allows a sender with two messages $m_0$, $m_1$ to send one of these two messages to a receiver without learning which message it sent. The receiver can possess a bit b and can receive message $m_b$. The privacy of oblivious transfer guarantees that the sender does not learn the choice bit b (and therefore does not learn which message the receiver received) and the receiver does not learn the other message $m_{1-b}$. Using modern techniques, this functionality can be extremely efficient to implement (e.g., a couple calls to a hash function). Secret sharing can include methods to effectively encrypt a value x. Particularly, two parties can each possess a random value $r_0$ or $r_1$, which can sum to equal x, while individually appearing random. The notation $[\![x]\!]$ denotes secret shares of x.

In some embodiments, during training, for each pair of model updates $u_0(s), u_1(s)$ generated by the anomaly detector computer 102, a corresponding account management computer can possess an indicator bit b, indicating whether data record s corresponds to a normal account or an abnormal account. The anomaly detector computer 102 can sample a random mask value $r_s$, then generate two messages $m_0 = u_0(s) - r_s$ and $m_1 = u_1(s) - r_s$. The anomaly detector computer 102 can then perform an oblivious transfer with the corresponding account management computer 106. The account management computer 106 can select a message to receive using the indicator bit b, thereby receiving a selected masked model update $m_b = u_b(s) - r_s$. Note that the account management computer 106 does not learn $u_b(s)$ due to the random mask value $r_s$. The account management computer 106 can define a secret share $r_B = m_b$. As such, a secret sharing $[\![u_b(s)]\!]$ between the anomaly detector computer 102 and the account management computer 106 has been established. The account management computer 106 can transmit the selected masked model update $m_b$ to the aggregator computer 104, such that a secret sharing $[\![u_b(s)]\!]$ is established between the anomaly detector computer 102 and the account management computer 106.

Another property of (additive) secret sharing is that multiple shares can be added together to produce a secret share of the underlying value. As such, the anomaly detector computer 102 and the aggregator computer 104 can add together all secret shares in the current batch to produce a secret share $[\![u]\!]$. Afterwards, the aggregator computer 104 can generate a noise term $\mathcal{N}(0,\sigma)$ and add it to their share of $[\![u]\!]$ to obtain the final sharing of the aggregated noisy model update. This secret sharing can then be revealed to the anomaly detector computer 102, completing the MPC protocol for the current training iteration. For inference, a similar protocol can be performed between the anomaly detector computer 102 and an account management computer. In particular, the account management computer can perform an oblivious transfer on $m_0 = l_0 - r_s$ and $m_1 = l_1 - r_s$ with the anomaly detector computer 102 and send the result $r_B = m_b$ back to the anomaly detector computer 102, which can then compute $l = r_s + r_b$.

C. Training and Inference Details

Figure 6:
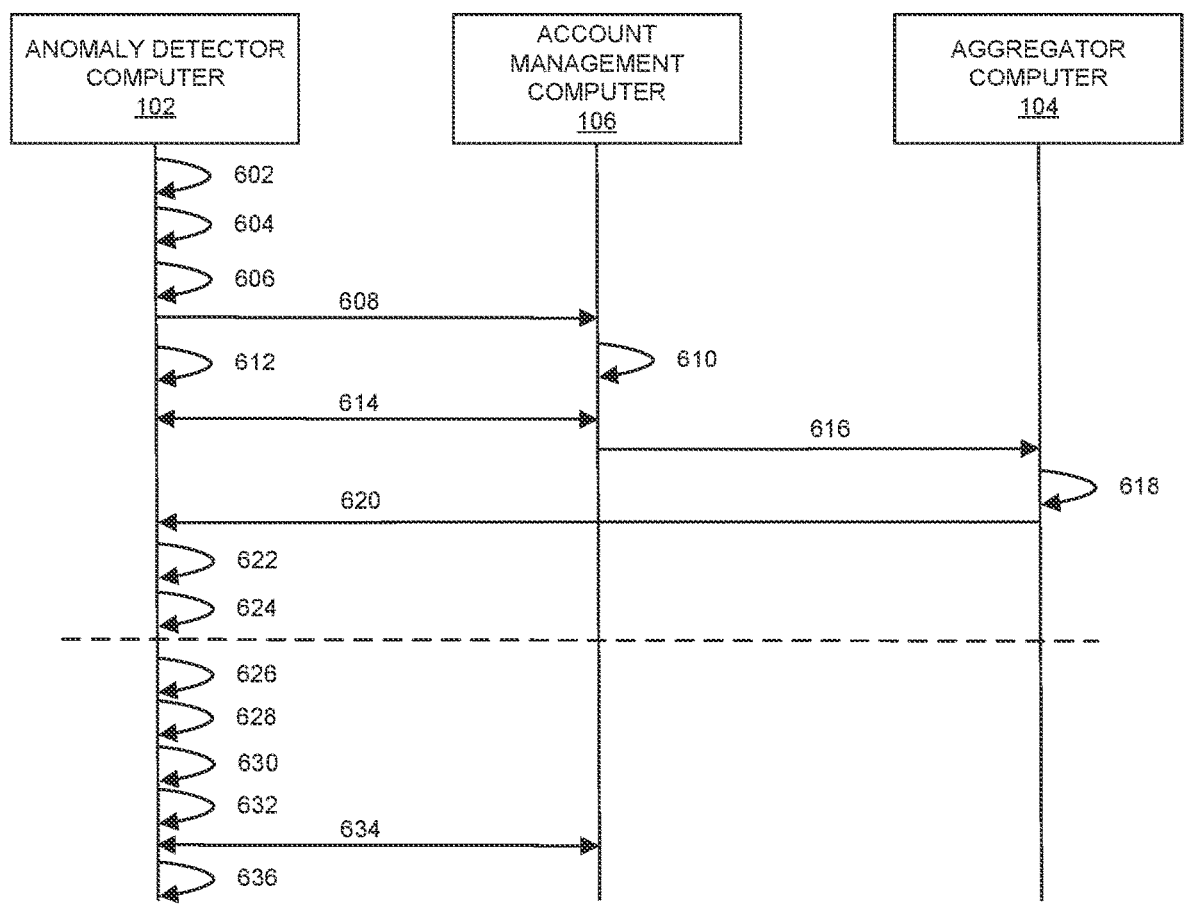
FIG. 6 shows a flow diagram illustrating a secure anomaly detection method according to embodiments.

FIG. 6 shows a flow diagram illustrating a secure anomaly detection method according to embodiments. The method illustrated in FIG. 6 will be described in context of the anomaly detector computer 102 training a machine learning model that classifies input transaction data as being not fraudulent transactions or fraudulent transactions. It is understood, however, that the invention can be applied to other circumstances.

At step 602, the anomaly detector computer 102 can obtain a plurality of training data records. In some embodiments, the anomaly detector computer 102 can communicate with a database (not shown) to obtain one or more training data records. In other embodiments, the anomaly detector computer 102 can store the plurality of training data records in memory.

The plurality of training data records can include any number of training data records. The plurality of training data records can include historical data relating to transactions processed by the anomaly detector computer 102. A training data record can include transaction data and a known classification (e.g., fraudulent or not fraudulent) associated with the transaction data. An account associated with the transaction data can have a label that can indicate whether the transaction data corresponds to a normal account or to an abnormal account. The label can be used as a secret input into the machine learning model. Since the anomaly detector computer 102 does not know if the account is normal or abnormal, the anomaly detector computer 102 can run the machine learning model twice (once with a label of normal and once with a label of abnormal) for each training data record.

At step 604, after obtaining the plurality of training data records, the anomaly detector computer 102 can train a model update to the machine learning model for each training data record. A model update can include a gradient (e.g., as used in a gradient decent process) for each training data record. The anomaly detector computer 102 can generate two model updates for each training data record, where the two model updates correspond to the training data record being associated with an account labeled as being a normal account and to the training data record associated with an account being labeled as an abnormal account.

As such, the anomaly detector computer 102 can generate a plurality of pairs of model updates corresponding to the plurality of training data records, where each pair of model updates comprises an abnormal account model update and a normal account model update. Each pair of model updates can correspond to an account management computer identifier and an account identifier that are associated with an entity involved in the transaction. For example, the account management computer identifier can identify an account management computer that maintains an account associated with the account identifier for an entity involved in the transaction. The account management computer 106 may have authorized the transaction, for example.

Steps 606-616 can be performed for each pair of model updates of the plurality of pairs of model updates.

At step 606, after generating the plurality of pairs of model updates, the anomaly detector computer 102 can identify a corresponding account management computer (e.g., the account management computer 106) using the account management computer identifier. In some embodiments, the account management computer identifier can be included in the transaction data used to train the pair of model updates.

At step 608, after identifying the account management computer 106, the anomaly detector computer 102 can transmit the account identifier to the account management computer 106.

At step 610, after receiving the account identifier, the account management computer 106 can identify an account based on the account identifier. For example, the account management computer 106 can receive an account identifier of "1234567890123456" and identify the account associated with the account identifier. The account management computer 106 can determines an account flag value based on a status of the account. The account flag value can be a value that indicates if the account is classified as being normal or as being abnormal.

For example, in some embodiments, the account management computer 106 can generate the account flag value that indicates if the account is associated with normal activity or abnormal activity (e.g., a large number of money transfers using a single account number originating from various geographic locations) based on the history of the account. In other embodiments, the account management computer 106 can obtain the account flag value, which can be stored in relation to the account. The account flag value can be persistent data that is held by the account management computer 106 can is updated over time.

At step 612, after providing the account identifier to the account management computer 106, the anomaly detector computer can generate a random mask value. The random mask value can be a random value capable of masking the abnormal account model update and the normal account model update. The anomaly detector computer 102 can generate the random mask value in any suitable manner of generating a random value and/or pseudorandom value.

The random mask value can be an integer value, a float value, a double value, etc. depending on the data included in the model updates. In some embodiments, the random mask value can include a vector, a matrix, or a higher order tensor.

At step 612, after generating the random mask value, the anomaly detector computer 102 can generate a masked pair of model updates comprising a masked normal account model update and a masked abnormal account model update using the random mask value. The anomaly detector computer 102 can apply the random mask value to the abnormal account model update and the normal account model update to respectively form the masked abnormal account model update and the masked normal account model update.

For example, the anomaly detector computer 102 can generate the masked normal account model update ($m_0$) by subtracting (or otherwise mask) the random mask value ($r_s$) from the normal account model update ($u_0$). The anomaly detector computer 102 can compute $m_0=u_0-r_s$. The anomaly detector computer 102 can generate the masked abnormal account model update ($m_1$) by subtracting the random mask value ($r_s$) from the abnormal account model update ($u_1$). The anomaly detector computer 102 can compute $m_1=u_0-r_s$.

At step 614, after generating the masked pair of model updates, the anomaly detector computer 102 can communicate with the account management computer 106 to perform an oblivious transfer process. Through the oblivious transfer process, the account management computer 106 can receive a selected masked model update comprising either the masked normal account model update or the masked abnormal account model update dependent on the account flag value.

During the oblivious transfer process the anomaly detector computer 102 can provide the masked normal account model update and the masked abnormal account model update (which can be referred to as messages in the oblivious transfer process) to the account management computer 106. The account management computer 106 can choose or determine one of the received messages ($m_b$) using an indicator bit (b) that is based on the account flag value.

The oblivious transfer process can include both oblivious transfer as well as secret sharing of data. Oblivious transfer is a two-party secure computation protocol that allows a sender (e.g., the anomaly detector computer 102) with two messages $m_0$ and $m_1$ to send one of the two messages to a receiver (e.g., the account management computer 106). The account management computer 106 can have a bit b and is able to learn the message mb. The bit b can be the account flag value that indicates if the account is normal or abnormal. The privacy of the protocol can guarantee that the anomaly detector computer 102 does not learn the account management computer 106's choice bit b and that the account management computer 106 does not learn the other message m1−b. The secret sharing can be thought of as a method to encrypt/mask a value x using a random mask value.

Specifically, the oblivious transfer process can include a 1-2 oblivious transfer, or other suitable oblivious transfer method. As an illustrative example, 1-2 oblivious transfer can be performed as follows.

The anomaly detector computer 102 can hold two messages $m_0$ and $m_1$. The anomaly detector computer 102 can generate an RSA key pair comprising the modulus N, the public exponent e, and the private exponent d. The anomaly detector computer 102 can then generate two random values $x_0$ and $x_1$. The anomaly detector computer 102 can provide the two random values $x_0$ and $x_1$, the public modulus N, and the public exponent e to the account management computer 106. The account management computer 106 can then select a bit b to be equal to a value of the account flag value (e.g., 0 if the account is a normal account or 1 if the account is an abnormal account). The account management computer 106 can then select the random value $x_b$, where b is 0 or 1. The account management computer 106 can then generate a random value k and uses the random value k to blind the selected random value $x_b$ by computing the blinded value v as $v=(x_b+k^e) \mod(N)$. The account management computer 106 can then provide the blinded value v to the anomaly detector computer 102. The anomaly detector computer 102 can then combine the blinded value v with both of the random values $x_0$ and $x_1$ to obtain two blinded random values (also referred to as keys) by computing $k_0=(v-x_0)^d \mod(N)$ and $k_1=(v-x_1)^d \mod(N)$. At this point $k_b$, where b is either 0 or 1, is equal to the value k and the other blinded random value will be a meaningless random value. However, since the anomaly detector computer 102 does not know which value of b that the account management computer 106 is using, the anomaly detector computer 102 cannot determine which of the blinded random values $k_0$ and $k_1$ are equal to k. The anomaly detector computer 102 can then combine the two messages $m_0$ and $m_1$ with each of the possible blinded random values $k_0$ and $k_1$ by computing $m'_0=m_0+k_0$ and $m'_1=m_1+k_1$. The anomaly detector computer 102 can provide both blinded messages $m'_0$ and $m'_1$ to the account management computer 106. The account management computer 106 knows the value of k and can therefore compute $m_b=m'_b-k$ to obtain message $m_b$, but cannot determine the other message $m_{1-b}$ since the account management computer 106 does not know the value of the private exponent d and thus cannot compute $k_{1-b}=(v-x_{1-b})^d \mod (N)$. As such, the message $m_b$ has been obliviously provided to the account management computer 106.

The anomaly detector computer 102 may not know which of the two masked model updates ($m_0$ and $m_1$) the account management computer 106 selected or obtained. The selected masked model update held by the account management computer 106 and the model update corresponding to the selected masked model update and the random mask value held by the anomaly detector computer 102 can be considered as secret shares of the model update.

At step 616, after the account management computer 106 receives or obtains the selected masked model update, the account management computer 106 can provide the selected or obtained masked model update to the aggregator computer 104.

Steps 606-616 can be repeated for each pair of model updates of the plurality of pairs of model updates. The anomaly detector computer 102 can communicate with one or more different account management computers. Each account management computer can provide selected masked model update to the aggregator computer 104.

At step 618, after receiving a plurality of selected masked model updates from the account management computer 106 and/or another account management computers, the aggregator computer 104 can generate a masked aggregated noisy model update by combining the plurality of selected masked model updates and a noise value.

For example, the aggregator computer 104 can generate a masked aggregated model update based on the plurality of selected masked model updates. The aggregator computer 104 can generate the masked aggregated model update by summing together each selected masked model update of the plurality of selected masked model updates.

The aggregator computer 104 can generate or otherwise obtain a noise value. The noise value can be a random value that can add sufficient noise to the model updates. The aggregator computer 104 can add the noise value to the masked aggregated model update to form the masked aggregated noisy model update. The noise value can add privacy to the system by hiding individual transaction contributions to the model update. The aggregator computer 104 can compute $[\![u]\!] = \Sigma s \in k [\![u(s)]\!] + [\![\mathcal{N}(0,\sigma)]\!]$.

At step 620, after generating the masked aggregated noisy model update, the aggregator computer 104 can provide the masked aggregated noisy model update to the anomaly detector computer 102.

At step 622, after receiving the masked aggregated noisy model update, the anomaly detector computer 102 can unmask (which may also be referred to as decrypting) the masked aggregated noisy model update. The anomaly detector computer 102 can unmask the masked aggregated noisy model update using one or more random mask values including the random mask value. The one or more random mask value can be previously generated during step 612 for each pair of model updates of the plurality of pairs of model updates. Unmasking the masked aggregated noisy model update can provide an aggregated noisy model update.

For example, the anomaly detector computer 102 can unmask the masked aggregated noisy model update by summing together each random mask value and adding the total random mask value to the masked aggregated noisy model update.

At step 624, after obtaining the aggregated noisy model update, the anomaly detector computer 102 can update the machine learning model using the aggregated noisy model update. For example, the aggregated noisy model update can indicate how the weights and parameters of the machine learning model should be altered to update the machine learning model.

At a later point in time, after the machine learning model has been created, the anomaly detector computer 102 can receive and process a transaction. The anomaly detector computer 102 can perform an inference process to classify the transaction as a not fraudulent transaction or as a fraudulent transaction using the machine learning model. The inference process is described in steps 626-632.

At step 626, the anomaly detector computer 102 can receive transaction data during a transaction between two entities (e.g., between a user of a user device and a resource provider of a resource provider computer). The transaction data can include data related to the transaction, processing of the transaction, and/or parties related to the transaction. For example, the transaction data can include a timestamp, an amount, credentials, a first party identifier, a second party identifier, an account identifier, an account management computer identifier, etc.

However, it is understood that embodiments are not limited to transaction data. For example, the anomaly detector computer can receive interaction data for an interaction that is to be processed by the anomaly detector computer 102.

During steps 628-632, the anomaly detector computer 102 can process the transaction data using the machine learning model and an oblivious transfer process with the account management computer 106 to determine if the transaction is classified fraudulent or not fraudulent.

At step 628, the anomaly detector computer 102 can generate a first label (e.g., fraudulent or not fraudulent) using the machine learning model, the transaction data, and a secret input of a normal account. For example, the anomaly detector computer 102 can run the machine learning model using the transaction data and an assumption that the transaction data is associated with a normal account. The first label can be the output of the machine learning model and can be a classification of the transaction being a not fraudulent transaction or a fraudulent transaction based on the assumption that the account associated with the transaction is a normal account.

At step 630, the anomaly detector computer 102 can generate a second label using the machine learning model, the transaction data, and a secret input of an abnormal account. For example, the anomaly detector computer 102 can run the machine learning model using the transaction data and an assumption that the transaction data is associated with an abnormal account. The second label can be the output of the machine learning model and can be a classification of the transaction being a not fraudulent transaction or a fraudulent transaction based on the assumption that the account associated with the transaction is an abnormal account.

At step 632, after generating the first label and the second label, the anomaly detector computer 102 can identify the corresponding account management computer 106 using the transaction data. For example, the anomaly detector computer 102 can obtain an account management computer identifier from the transaction data. The anomaly detector computer 102 can identify the account management computer 106 associated with the account management computer identifier.

At step 634, after identifying the account management computer 106, the anomaly detector computer 102 and the account management computer 106 can perform an oblivious transfer process so that the account management computer 106 can select between the first label and the second label in a privacy-preserving manner.

The oblivious transfer process can result in the account management computer 106 selecting between the first label and the second label dependent on an account flag value held by the corresponding account management computer 106. The account flag value can be a flag that is associated with the account and can indicate whether or not the account used to conduct the transaction is classified as a normal account or an abnormal account. The selected label can be revealed to the anomaly detector computer 102. The oblivious transfer process can be performed as described above.

During step 634, the anomaly detector computer 102 can receive the selected or obtained label (fraud or not fraud) from the account management computer 106.

At step 636, after obtaining the label from the account management computer 106, the anomaly detector computer 102 can classify the interaction as fraudulent or not fraudulent based on the selected label. For example, the determined label can indicate that the transaction is fraudulent.

The anomaly detector computer 102 can then perform additional processing based on the classification of the transaction. For example, if the transaction is classified as fraudulent, then the anomaly detector computer 102 perform further evaluations on the transaction or can automatically deny the transaction. In other embodiments, the anomaly detection computer 102 could send communications appropriate authorities to notify them of potentially fraudulent transactions, and accounts associated with them could be automatically closed. This advantageously improves data security.

D. Advantages, Performance, and Privacy

Various aspects related to the performance and privacy of embodiments will be discussed in terms of expected accuracy and performance, expected efficiency and scalability, expected trade-offs between privacy and utility, and usability and transparency.

1. Expected Accuracy & Performance

The pipeline according to embodiments was evaluated on a sample data set. Results are shown in Table 1, below. The neural net (NN) model, according to embodiments, consistently outperforms the XGBoost baseline with no account information from the account management computer 106. Embodiments achieve a PR-AUC of 0.63 with noiseless gradient updates, beating 0.53—the XGBoost baseline result with no account status flag—by a considerable margin.

To reduce privacy leakage, embodiments can clip the gradient by its norm and add noise to the aggregated gradient (e.g., using opacus). PR-AUC of 0.59 is obtained with gradient clipping only. It reduces to 0.57 if the noise multiplier in opacus is set to 10. Both results are still above the XGBoost baseline. Note that for fair comparison, we have refrained from significant feature engineering which will further increase accuracy of embodiments. For comparison, methods according to embodiments utilize the same features as the XGBoost baseline and binary features inferred by split rules in the XGBoost model.

TABLE 1

Initial evaluation on the sample data set.

| Method | PR-AUC |
|---|---|
| NN (Embodiments, vanilla) | 0.63 |
| NN (NormClip) | 0.59 |
| NN (NormClip + Noise) | 0.57 |
| XGBoost (No account management computer info) | 0.53 |

2. Expected Efficiency & Scalability

Systems and methods according to embodiments are scalable with the number of participating account management computers since only the account management computer is required for evaluating a transaction participates in the protocol.

Model training can include back and forth communication between the anomaly detector computer 102 and the aggregator computer 104 in the order of the update size times the number of training steps. Given these parameters are finite and fixed, embodiments can scale for training on millions of transactions. Training the centralized model for 100 epochs took about three hours without optimizing the code. It is expected that the main limiting factor of the federated solution to be the communication between the parties. As there is one communication per gradient, the communication cost, while high, is reasonable and is expected to be close to optimal for most privacy preserving federated learning systems.

3. Expected Trade-offs Between Privacy & Utility

Embodiments provide for two distinct types of privacy protection. A first type of privacy protection is the privacy of the transactions themselves. The anomaly detector computer 102 reveals no information about the transaction details other than which receiving bank is involved (to the aggregator computer 104) and which account (to the account management computer 106). There is no significant trade-off here.

A second type of privacy protection is the unavoidable leakage on the very limited information carried by the banks (e.g., the privacy of the account flags). Here, embodiments aggregate the updates and use noise to hide which receiving account has a flag different from zero from the anomaly detector computer 102. However, the leakage inherent in the problem setting means that for the vast majority of accounts the anomaly detector computer 102 can have a fairly good idea (e.g., estimate) if the accounts have flag zero or not. That said, embodiments generally allow for the adjustment of the noise applied by the aggregator computer 104. Such noise is to hide which model was updated by which transaction and thus whether the respective account was flagged. There is a trade-off here: adding more noise will protect the flags of accounts better, but will also diminish the training effectiveness.

4. Usability & Explainability

The conceptual simplicity of systems and methods means that it remains fairly explainable to the anomaly detector computer 102. The account management computer 106 will not be able to learn anything of value about the model, but the anomaly detector computer 102 can develop a decent understanding of what makes a transaction anomalous. Note that the anomaly detector computer 102 has almost all the data and can easily create a local model that will perform decently on its own. Embodiments utilize communication during training (which is linear with respect to the number of training steps), but predicting a label for a new transaction during inference time is very fast.

V. Proof of Privacy

In this section, the proposed framework's privacy guarantees at the time of training and inference while ensuring high utility will be discussed.

A. Privacy Against Aggregator Computers

The aggregator computer 104 participates in the training phase, but not in the inference phase. Recall that it can be assumed that either the aggregator computer 104 or the anomaly detector computer 102 is honest. As such, for this section it is assumed that the anomaly detector computer 102 is honest. Privacy against the aggregator computer 104 then reduces to the security of the underlying oblivious transfer protocol and the properties of secret sharing. In particular, the oblivious transfer guarantees that the aggregator computer 104 (and the account management computer 106) only learn $u_b(s)-s_0$ where $s_0$ is uniformly random. As such, this leaks no information to the aggregator computer 104. Moreover, the aggregator computer 104 receives no other information during the protocol other than the identity of the receiving account management computer 106.

The other role of the aggregator computer 104 is to sample the noise. As such, it can be assumed that the aggregator will not observe the model or its outputs. In the event that this assumption is too strong, the protocol can be modified to have the anomaly detector computer 102 and the aggregator computer 104 jointly sample the noise using MPC.

B. Privacy Against Account Management Computers

During training, the account management computer 106 only learns the account queried and the secret share $s_1$. As discussed above, $s_1$ leaks no information. In addition, learning the account queried is inherent to the problem setting as discussed herein.

C. Privacy Against Anomaly Detector Computers

During training, the anomaly detector computer 102 receives a model update from the aggregator computer 104. Having computed the individual updates (two per transaction), the anomaly detector computer 102 could potentially attempt to find out the update selected for each transaction to infer the account flags. However, embodiments provide for the aggregator computer 104 to apply noise of sufficient magnitude to the aggregator computer 104's update for each batch to prevent the anomaly detector computer 102 from inferring flags. In addition, the noise can be calibrated to the sensitivity of individual transaction updates in relation to the overall update. Functionally, this can be achieved by clipping the updates and calibrating the noise to the clipping norm and the expected number of transactions per account.

In some embodiments, the aggregator computer 104 can clip the updates via norm clipping before they are aggregated. Moreover, as embodiments care to hide flag-information about accounts and not individual transactions from the anomaly detector computer 102, the expected number of transactions from the same account in a batch should be considered. This aspect is exaggerated by the up-scaling of fraudulent transactions in the dataset. The upscaled dataset comprises 7,000,000 records overall. Within this dataset, there are individual accounts with up to 7,000 transactions. With a batch size of about 8,000, there can be expected to be around $$8 = \frac{8k \cdot 7k}{7M}$$

transactions from the most prevalent account. The noise can be calibrated to have a standard deviation of 10 times the clipping bound, thus covering the impact of even the worst case account holders to the overall update. Given the significant inherent leakage present in the problem statement, this amount of noise can be sufficient.

During inference, the anomaly detector computer 102 can learn the final classification of a transaction, which does not provide information about the account flag from the account management computer 106 other than the inherent privacy leakage discussed herein.

D. Fully Malicious

Here the case where one or more of the parties are fully malicious is considered, along with the countermeasures that could theoretically be taken.

If the anomaly detector computer 102 is fully malicious, the anomaly detector computer 102 can change the dataset and fully poison either or both of the models (e.g., the normal account machine learning model and the abnormal account machine learning model). A fully malicious anomaly detector computer 102 could even infer some information about the flags by training on a batch of event data comprising event data corresponding to the same account. In this way, the anomaly detector computer 102 might infer from the aggregates which of the two models was mainly updated. Protecting against a fully malicious anomaly detector computer 102 is out of scope of embodiments, as it would involve committing on all event data as well as on the data gathering steps that lie outside of the scenario. In the scenario, the anomaly detector computer 102 is assumed to have the ground truth on the entire event dataset, which would allow the anomaly detector computer 102 to arbitrarily poison the models it trains and to replace accounts of all events with just one account that the anomaly detector computer 102 (or its operator) wants to learn the account flags of.

A malicious aggregator computer 104 can send incorrect or poisoned updates back to the anomaly detector computer 102. Embodiments of the present disclosure can be extended to include (fairly inexpensive) Zero-Knowledge proofs, in which the aggregator computer 104 demonstrates that any data (e.g., model updates, labels, classifications, etc.) returned to the anomaly detector computer 102 was indeed computed honestly. These proofs can include a proof about the honest sampling and application of noise as well, which could be replaced with a small MPC protocol where several account management computers collectively sample the noise for a batch of events (e.g., transactions).

Further, fully malicious account management computers can only lie about the flags of their own accounts over which they possess the ground truth. The only apparent attack seems to be that the account management computer 106 might give conflicting answers about the same account. To protect against this, each account management computer 106 could commit to its entire dataset of accounts and then prove that the response given by the account management computer is correct without revealing the specific account.

Notably, there can always be some leakage inherent to the general problem setting and not specific to embodiments of the present disclosure: Since the anomaly detector computer 102 is only missing account flag values held by account management computers (as discussed previously), it has enough information to create its own local models that can classify whether an event is not fraudulent or fraudulent with fair accuracy (e.g., solely based on the event data features already known by the anomaly detector computer 102). If the anomaly detector computer 102 classifies an event as not anomalous using its own local model, but the overall classification (regardless of how it is structured) labels the event as anomalous, then the anomaly detector computer 102 can reliably predict that the corresponding account has an abnormal account flag (e.g., a flag deviating from 00). If the overall solution labels an event as not fraudulent, then the anomaly detector computer 102 can determine that the receiving account may have a normal account flag (e.g., an account flag of 00). In addition, an event being present in the data set can indicate that a sending account can have a normal account flag. For example, during a transaction, a sending account may comprise an account that sends funds, while a receiving account may comprise an account that receives funds.

VI. Experimental Results

Various experimental results will be discussed.
A. Centralized Solution
The model architecture, according to embodiments, can include a multi-layer perceptron (MLP). An MLP can be trained by stochastic gradient descent. The MLP, as an example, can have three hidden layers with 256, 64, and 16 hidden nodes, respectively, using ReLU activation. Such a moderate size is chosen for two main considerations. First, it is suitable for the size of the data sets. Second, the per-sample gradient in stochastic gradient descents has the same size as the network; having a moderate-sized network gives reasonable size of messages, which saturates, but does not overly stress, the communication channel.
B. Federated Solution within Flower
The experimental solution was created within the Flower framework and utilizes the Opacus library, which enables the system to compute a per-sample gradient. For oblivious transfer, the system sideloads libOTe C++ library.

The Flower framework for the experiment has the following two restrictions which affects the solution. 1) It does not allow direct client to client communication for Federated learning, and the solution requires the anomaly detector computer 102 and the account management computer(s) to communicate. 2) Messages are limited to 500 MB in the Flower framework.

To circumvent the client-client communication limitation, we utilized disk reads and writes as follows: In each round of the framework, all clients are reconstructed, so any state must be serialized and stored on disk at the end of each round, and then loaded at the beginning of the next. Also, before clients are initialized in a round, the server can set client-specific messages, while at the end of the client round, the client can return a message to the server. Therefore, first, the sending client sends a message to the server, and at the beginning of the next round, the server sends it to the intended recipient client. Although the server sees all messages, privacy is preserved since all payloads are masked.

For the message limitation in the experiment framework, multiple rounds to execute the transfer depending on the batch size k were used.

The flow of the solution within the Flower framework for the experiment will be described at a high level.

Round 1: We first pre-processed data within partitions by creating a list of all account management computers in the partition data set and created a dictionary which indicates if there's a 00 or non-00 flag for each account ID. Then the anomaly detector computer 102, after it received a list of the banks belonging to each partition, it pre-processed training data by breaking it into smaller sets such that they can be loaded into memory in batches, as required by the framework. As an optimization, the anomaly detector computer 102 also derived the account management computer 106 flags for accounts in non-anomalous transactions and pre-trimmed the model using only transactions with those derived flags. We note that all of the pre-processing in this round cannot be executed within the setup phase provided since the setup phase does not provide access to the data itself.

Round 2: the anomaly detector computer 102 used SenderSetup ( ) from libOTe for all partitions, and sent to each partition the accounts it will be querying.

Round 3: We executed ReceiverSetupo from libOTe for all partitions and ReceiverGenerate(for keys to the anomaly detector computer 102.

Round 4: the anomaly detector computer 102 executed SenderSetup2( ) for all partitions and SenderGenerateKeyso for all accounts, which marks the end of OT setup. Then for beginning the training flow, the anomaly detector computer 102 generated the two possible gradients g0, g1, encrypts each one with the appropriate keys, sampled a random mask rS and added it to the two gradients while saving rS in its memory. Finally, the anomaly detector computer 102 sent (AccountID, Enc(g0), Enc(g1)) to each respective partition.

Then the following rounds are executed for each batch k:
Round i: each partition decrypted the appropriate Enc(gx) using AccountID, added each gradient together, and sent the resulting gradient to the Flower server.

Round i+1: the Flower server added up each partition gradient, then added noise with exponential decay A as parameter using Numpy.random.laplace, and sent the resulting gradient to the anomaly detector computer 102. Then the anomaly detector computer 102 updated its model with the received gradient after unmasking it. Also, the anomaly detector computer 102 initiates a new round of training by generating new two possible gradients g0, g1 and proceeding in a similar fashion as described in Round 4 in preparation for the next batch.
C. Privacy-Accuracy Tradeoff The aggregator computer 104, the account management computers, and any curious outsiders have no advantage in deducing private information from embodiments. Against those parties that privacy is preserved up to the point where the underlying cryptography breaks.

The only party for which the quantitative bounds are needed is for the anomaly detector computer 102. Due to the fact that the anomaly detector computer 102 performs the majority of the required training tasks, this party can gain insights into information not already provided by its own significant share of the data or inherent in the problem setting: account flags influence the gradient update that the anomaly detector computer 102 receives from the aggregator computer 104 via the individual updates before aggregation. The account flags hidden by applying noise to the updates. However, the anomaly detector computer 102 can attempt to perform an adversarial analysis of the aggregated and noised updates to infer flag information. To quantify the potential success chance of such attacks, we implement the following experimental attack. The amount of noise added to the aggregated updates relates to the success chance of such attacks on privacy, as well as how they impact the resulting model's performance.

Table 2, below, illustrates the privacy-accuracy tradeoff for two privacy settings: strong privacy, where a very large amount of noise is added; and weak privacy, where very little noise is added. For each of those scenarios the standard deviation of the noise added to each gradient update aggregate ($\sigma$), the adversarial advantage in the attack described above (Attack), and the overall performance of the resulting model, according to embodiments, as measured by the AUC is illustrated. ADV<=0.2 means the attacker knows fewer than 20% of the bank flags in the training data. A more fine-grained result is presented in Table 4, below.

TABLE 3 privacy-accuracy tradeoff for two privacy settings

| | $\sigma$ | Attack | AUC |
|---|---|---|---|
| Strong | 0.2 | ADV <= 0.2 | 0.65 |
| Weak | 0.1 | ADV <= 0.2 | 0.72 |

Table 4 illustrates details of the privacy-accuracy tradeoff. Larger area under precision recall curve (AUPRC) values indicates better anomaly detection model performance. Smaller MIA success rate corresponds to better privacy-protection of bank account flag during training. Gaussian noise with a $\sigma=0.2$ and Laplace noise with $\lambda=0.1$ achieves a good trade-off. The baseline for attacker success (e.g., always guess 00) given account flag distribution in the training set is 0.82. MIA success rate below 0.82 is a good measure of privacy-protection.

TABLE 4 privacy-accuracy tradeoff details

| | Noise | MIA Success Rate | AUPRC |
|---|---|---|---|
| Strong $\alpha = 0.2$ | No Noise | 0.93 | 0.79 |
| | Gaussian, $\sigma = 0.1$ | 0.92 | 0.72 |
| | Laplace, $\lambda = 0.1$ | 0.86 | 0.70 |
| | Gaussian, $\sigma = 0.2$ | 0.80 | 0.65 |
| | Laplace, $\lambda = 1$ | 0.57 | 0.13 |
| Weak $\alpha = 0.05$ | No Noise | 0.89 | 0.79 |
| | Gaussian, $\sigma = 0.1$ | 0.89 | 0.72 |
| | Laplace, $\lambda = 0.1$ | 0.84 | 0.70 |
| | Gaussian, $\sigma = 0.2$ | 0.79 | 0.65 |
| | Laplace, $\lambda = 1$ | 0.56 | 0.13 |

D. Optimizations and Other Considerations

In some training data sets, it is observed that whenever a non-zero flagged account participates in a transaction, that transaction is always labeled as anomalous. The contrapositive of that observation implies that during training, for all non-anomalous labeled transactions, the respective receiver account flag is always 00. Therefore, the anomaly detector computer 102 does not need to communicate and perform oblivious transfer to receive the respective gradients, and only has to perform this for the anomalous accounts during training. However, although the anomalous transactions only represent a~0.1% minority in the data sets, transactions need to be re-sampled to have a better balance between anomalous and non-anomalous transactions in a training set for producing a more accurate model. Still, approximately half of those anomalous transactions are associated with other transactions that are marked as non-anomalous. Eventually, by having a re-sampled dataset with a 1:10 ratio of anomalous and non-anomalous transactions, embodiments end up with an efficiency improvement by a factor of 20.

The above observations imply another form of privacy leakage, not only to the anomaly detector computer 102 which learns the account flag for the majority of the accounts, but also to account management computers, since they learn which accounts have participated in a transaction labeled as anomalous (even if they have a flag of 00). However, such a privacy leakage is present also when up-sampling the dataset as discussed above, therefore the privacy impact of taking advantage of the above towards better efficiency is minimal.

As a further optimization, oblivious transfer computations can be cached during the training phase and later reused. This optimization can effectively reduce the number of oblivious transfers needed by a factor of 6 and improve the rounds of interaction by a factor of 2. This latter benefit can have a large impact on the overall performance, as interaction latency can comprise a bottleneck.

VII. Data

Generalization of privacy protection will be discussed. Methods according to embodiments permit calibration of noise to be significant enough to guarantee differential privacy. Given the inherent leakage that will persist independently of the solution and the expected trade-off in cost (e.g., in terms of model performance) for achieving differential privacy guarantees.

As per the generalization of the threat model and security, it has already been noted how things change if our threat model were to allow for malicious parties. If the anomaly detector computer 102 and the aggregator computer 104 were to be allowed to collude, then a more intensive secure multi-party computation can be utilized. With respect to the leakage of information, for instance, the aggregator computer 104 learns the receiver account management computer 106 of every transaction and the account management computer 106 learns which of their accounts are used, and precisely how many times and in what sequence. It is indeed possible to avoid leaking all of this information by expanding more in terms of communication and computation, for example, using tools from secure multi-party computation.

As per the generalization to other account information/flags, the way embodiment approach incorporating flag information into the model trained by the anomaly detector computer 102 might give the appearance to be tailored to this specific scenario where the account management computer 106 only holds one bit worth of information about an account. In fact, the solution generalizes in several ways. Firstly, the account management computer 106 can compute their inputs in any way they want. Secondly, as long as the account management computer 106 encodes their information in a small number of categories, each of which can be a percentage instead of a bit, embodiments can still use the same structure.

Consider that the account management computer 106 may prefer to have a risk score from 0 to 1 instead of a bit. In that case, the two updates can be applied to the model with differing magnitude (depending on the risk score) and the final prediction can be made by combining the anomaly detector computer 102's labels (which in this case might also be risk scores) weighted by the risks considered by the account management computer 106.

As an example of more features, consider that the account management computer 106 might prefer to have a general risk score and a cross-border risk score, each of which can range from 0 (clearly normal; no risk) to 1 (large risk; abnormal). The anomaly detector computer 102 can train its model with four potential secret inputs (2·2) and additionally to the four model updates $g_i(s)$ and the label predictions li provide as part of its private input a bit on whether or not a transaction was cross-border. The same type of computation can be used to determine the final update for each transaction. To compute the final prediction during inference, the bit from the anomaly detector computer 102 can be used to see if it was cross-border or not, and the combination of risk scores for that case to derive the final prediction.

Alternatively, embodiments can train a small number of models for specific categories (e.g., stable average accounts, daytime spend accounts, nighttime spend accounts). The account management computer 106 might classify an account as (20%, 30%, 50%). The anomaly detector computer 102 can augment its model with three secret inputs, yielding three updates, each of which will be weighted by the aggregator computer 104 by how much the account fits to the model. Equally, prediction weighs the labels or risk scores from each model according to the account management computer 106's classification (in this example as 0.2·$\ell$0+0.3·$\ell$1+0.5·$\ell$2).

Embodiments can be generalized to more complex heterogeneous settings. Each client can train its own model incrementally (e.g., by gradient descent) and can send updates to the aggregator computer 104. The privacy properties hold when the aggregation step—including but not limited to model selection, vector concatenation and weighted sum—can be efficiently computed with securely (e.g., using secure multi-party computation or homomorphic encryption).

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

REFERENCES

1. IRS is trying to deanonymize privacy coins like monero and zcash, forbes.com/sides/shehanchandrasekera/2020/07/06/irs-is-trying-to-deanonymize-privacy-coins-like-monero-and-zcash/#4067506c4174
2. Regulation (EU) 2016/679 of the European parliament and of the council of 27 Apr. 2016 on the protection of natural persons with regard to the processing of personal data and the free movement of such data, and repealing directive 95/46/ec (general data protection regulation). Official Journal of the European Union L119 pp. 1-88 (2016).
3. Ben-Sasson, E., Chiesa, A., Garman, C., Green, M., Miers, I., Tromer, E., Virza, M.: Zerocash: Decentralized anonymous payments form bitcoin. In: 2014 IEEE Symposium on Security and Privacy. Pp. 495-474. IEEE Computer Society Press (May 2014). doi.org/10.1109/SP.2014.36
4. Chatzigiannis, P., Baldimtsi, F., Chalkias, K.: Auditability and accountability in distributed payment systems. In: Sako, K., Tippenhauer, N. O. (eds.) ACNS 21, Part II. LNCS, vol. 12727, pp. 311-337. Springer, Heidelberg (June 2021). doi.org/10.1007/978-3-030-78375-4_13
5. Cheng, K., Fan, T., Jin, Y., Liu, Y., Chen, T., Papadopoulos, D., Yang, Q.: Secureboot: A lossless federated learning framework. IEEE Intell. Syst. 36(6), 87-98 (2021). doi.org/10.1109/MIS.2021.3082561, doi.org/10.1109/MIS.2021.3082561
6. Hard, A., Rao, Ki., Mathews, R., Beaufays, F., Augenstein, S., Eichner, H., Kiddon, C., Ramage, D.: Federated learning for mobile keyboard prediction. CoRR abs/1811.03604 (2018), http://arxiv.org/abs/1811.03604
7. Jin, X., Chen, P., Hsu, C., Yu, C., Chen, T.: CAFE: catastrophic data leakage in vertical federated learning. CoRR abs/2110.15122 (2021), arxiv.org/abs/2110.15122
8. Kairouz, P., et. al.: Advances and open problems in federated learning. Found. Trends Mach. Learn 14(1-2), 1-210 (2021). doi.org/10.1561/2200000083
9. Li, Y., Bao Y., Xiang, L., Liu, J., Chen, C., Wang, L., Wang, X.: Privacy threats analysis to secure federated learning. CoRR abs/1909.12946 (2019), http://arxiv.org/abs/1909.12946
10. Suzumura, T., Zhou, Y., Barcardo, N., Ye, G., Houck, K., Kawahara, R., Anwar, A., Stavarache, L. L., Klyashtorney, D., Ludwing, H., Bhaskarana, K.: Toward federated graph learning for collaborative financial crimes detection. CoRR abs/1909.12946 (2019), http://arxiv.org/abs/1909.12946
11. Van Saberhagen, N.: Cryptonote v 2.0 (2013), cryptonote.org/whitepaper.pdf
12. We, K., Li, J., Ma, C., Ding, M., Wei, S., Wu, F., Chen, G., Ranbaduge, T.: Vertical federated learning: Challenges, methodologies and experiments. CoRR abs/2202.04309 (2022), arxiv.org/abs/2202.04309

What is claimed is:

1. A method comprising:
    obtaining, by an anomaly detector computer, a plurality of training data records;
    generating, by the anomaly detector computer, a plurality of pairs of model updates corresponding to the plurality of training data records, each pair of model updates comprising an abnormal account model update and a normal account model update, each pair of model updates corresponding to an account management computer identifier and an account identifier, wherein each pair of model updates includes an update to a machine learning model;
    for each pair of model updates of the plurality of pairs of model updates:
        identifying, by the anomaly detector computer, a corresponding account management computer using the account management computer identifier;
        transmitting, by the anomaly detector computer, the account identifier to the corresponding account management computer, which identifies an account based on the account identifier, and determines an account flag value based on a status of the account;
        generating, by the anomaly detector computer, a random mask value;
        generating, by the anomaly detector computer, using the random mask value, a masked pair of model updates comprising a masked normal account model update and a masked abnormal account model update; and
        performing, by the anomaly detector computer, an oblivious transfer with the corresponding account management computer, the corresponding account management computer thereby receiving a selected masked model update comprising either the masked normal account model update or the masked abnormal account model update dependent on the account flag value, wherein the corresponding account management computer transmits the selected masked model update to an aggregator computer, the aggregator computer thereby receiving a plurality of selected masked model updates corresponding to the plurality of pairs of model updates from one or more account management computers;
    receiving, by the anomaly detector computer, from the aggregator computer, a masked aggregated model update, wherein the aggregator computer generated the masked aggregated model update from the plurality of selected masked model updates;
    unmasking, by the anomaly detector computer, the masked aggregated model update using one or more random mask values including the random mask value, thereby producing an aggregated model update; and
    updating, by the anomaly detector computer, the machine learning model using the aggregated model update.

2. The method of claim 1, wherein the masked aggregated model update is a masked aggregated noisy model update, the aggregated model update is an aggregated noisy model update, and wherein the aggregator computer generated the masked aggregated noisy model update by combining the plurality of selected masked model updates and a noise value generated by the aggregator computer.

3. The method of claim 2, wherein the noise value is a random value.

4. The method of claim 2, wherein unmasking the masked aggregated noisy model update comprises:
    determining, by the anomaly detector computer, a total random mask value from the one or more random mask values; and
    combining, by the anomaly detector computer, the total random mask value and the masked aggregated noisy model update to obtain the aggregated noisy model update.

5. The method of claim 1 further comprising:
receiving, by the anomaly detector computer, interaction data for an interaction that is to be processed by the anomaly detector computer;
generating, by the anomaly detector computer, a first label using the machine learning model, the interaction data, and a secret input of a normal account;
generating, by the anomaly detector computer, a second label using the machine learning model, the interaction data, and a secret input of an abnormal account;
identifying, by the anomaly detector computer, the corresponding account management computer using the interaction data;
performing, by the anomaly detector computer, another oblivious transfer with the corresponding account management computer, the corresponding account management computer thereby selecting between the first label and the second label dependent on the account flag value held by the corresponding account management computer, wherein the selected label is revealed to the anomaly detector computer;
receiving, by the anomaly detector computer, the selected label from the account management computer; and
classifying, by the anomaly detector computer, the interaction as fraudulent or not fraudulent based on the selected label.

6. The method of claim 5, wherein the interaction data is transaction data and wherein the interaction is a transaction.

7. The method of claim 5 further comprising:
after classifying the interaction as fraudulent or not fraudulent, if the interaction is classified as fraudulent, denying, by the anomaly detector computer, the interaction.

8. The method of claim 1, wherein the abnormal account model update is a first gradient descent value indicating how to update parameters and weights of the machine learning model if the corresponding account is abnormal, and wherein the normal account model update is a second gradient descent value indicating how to update the parameters and the weights of the machine learning model if the corresponding account is normal.

9. The method of claim 1, wherein generating the plurality of pairs of model updates corresponding to the plurality of training data records comprises:
generating, by the anomaly detector computer, a normal account model update using the machine learning model, a training data record of the plurality of training data records, and a first secret input indicating a normal account; and
generating, by the anomaly detector computer, an abnormal account model update using the machine learning model, the training data record, and a second secret input indicating an abnormal account.

10. The method of claim 1, wherein generating the masked pair of model updates comprises:
generating, by the anomaly detector computer, the masked normal account model update using the normal account model update and the random mask value; and
generating, by the anomaly detector computer, the masked abnormal account model update using the abnormal account model update and the random mask value.

11. The method of claim 1, wherein the plurality of training data records comprises a plurality of transaction data.

12. The method of claim 1, wherein obtaining the plurality of training data records comprises:
receiving, by the anomaly detector computer, the plurality of training data records from a database or memory.

13. The method of claim 1, wherein the plurality of training data records comprise a plurality of not fraudulent training data records and a plurality of fraudulent training data records, wherein for each fraudulent training data record there are at least not fraudulent training data records.

14. An anomaly detector computer comprising:
a processor; and
a computer-readable medium coupled to the processor, the computer-readable medium comprising code executable by the processor for implementing a method comprising:
obtaining, by the anomaly detector computer, a plurality of training data records;
generating, by the anomaly detector computer, a plurality of pairs of model updates corresponding to the plurality of training data records, each pair of model updates comprising an abnormal account model update and a normal account model update, each pair of model updates corresponding to an account management computer identifier and an account identifier, wherein each pair of model updates includes an update to a machine learning model;
for each pair of model updates of the plurality of pairs of model updates:
identifying, by the anomaly detector computer, a corresponding account management computer using the account management computer identifier;
transmitting, by the anomaly detector computer, the account identifier to the corresponding account management computer, which identifies an account based on the account identifier, and determines an account flag value based on a status of the account;
generating, by the anomaly detector computer, a random mask value;
generating, by the anomaly detector computer, using the random mask value, a masked pair of model updates comprising a masked normal account model update and a masked abnormal account model update; and
performing, by the anomaly detector computer, an oblivious transfer with the corresponding account management computer, the corresponding account management computer thereby receiving a selected masked model update comprising either the masked normal account model update or the masked abnormal account model update dependent on the account flag value, wherein the corresponding account management computer transmits the selected masked model update to an aggregator computer, the aggregator computer thereby receiving a plurality of selected masked model updates corresponding to the plurality of pairs of model updates from one or more account management computers;
receiving, by the anomaly detector computer, from the aggregator computer, a masked aggregated model update, wherein the aggregator computer generated the masked aggregated model update from the plurality of selected masked model;
unmasking, by the anomaly detector computer, the masked aggregated model update using one or more random mask values including the random mask value, thereby producing an aggregated model update; and updating, by the anomaly detector computer, the machine learning model using the aggregated model update.

15. The anomaly detector computer of claim 14, wherein the method further comprises:

receiving, by the anomaly detector computer, interaction data for an interaction that is to be processed by the anomaly detector computer;

generating, by the anomaly detector computer, a first label using the machine learning model, the interaction data, and a secret input of a normal account;

generating, by the anomaly detector computer, a second label using the machine learning model, the interaction data, and a secret input of an abnormal account;

identifying, by the anomaly detector computer, the corresponding account management computer using the interaction data;

performing, by the anomaly detector computer, another oblivious transfer with the corresponding account management computer, the corresponding account management computer thereby selecting between the first label and the second label dependent on the account flag value held by the corresponding account management computer, wherein the selected label is revealed to the anomaly detector computer;

receiving, by the anomaly detector computer, the selected label from the account management computer; and classifying, by the anomaly detector computer, the interaction as not fraudulent or fraudulent based on the selected label.

16. The anomaly detector computer of claim 14, wherein the corresponding account management computer maintains the account associated with the account identifier and stores the account flag value in relation to the account identifier.

17. The anomaly detector computer of claim 14, wherein the masked aggregated model update is a masked aggregated noisy model update, the aggregated model update is an aggregated noisy model update, and wherein the aggregator computer generated the masked aggregated noisy model update by combining the plurality of selected masked model updates and a noise value generated by the aggregator computer, and wherein generating the plurality of pairs of model updates corresponding to the plurality of training data records comprises:

generating a normal account model update using the machine learning model, a training data record of the plurality of training data records, and a first secret input indicating a normal account; and generating an abnormal account model update using the machine learning model, the training data record, and a second secret input indicating an abnormal account, and wherein unmasking the masked aggregated noisy model update comprises:

determining a total random mask value from the one or more random mask values; and combining the total random mask value and the masked aggregated noisy model update to obtain the aggregated noisy model update.

18. The anomaly detector computer of claim 14 further comprising:

a model update module;
an oblivious transfer module; and
an interaction processing module.

* * * * *